US010375899B2

(12) United States Patent

Munt, III

(10) Patent No.: US 10,375,899 B2
(45) Date of Patent: Aug. 13, 2019

(54) REUSABLE POTTING SYSTEMS AND METHODS

(71) Applicant: Dean John Munt, III, Perris, CA (US)

(72) Inventor: Dean John Munt, III, Perris, CA (US)

(73) Assignee: Dean John Munt, III, Perris, CA (US)

( * ) Notice: Subject to any disclaimer, the term of this patent is extended or adjusted under 35 U.S.C. 154(b) by 208 days.

(21) Appl. No.: 14/833,031

(22) Filed: Aug. 21, 2015

(65) Prior Publication Data

US 2016/0050855 A1 Feb. 25, 2016

Related U.S. Application Data

(60) Provisional application No. 62/040,734, filed on Aug. 22, 2014.

(51) Int. Cl.
*A01G 9/02* (2018.01)
*A01G 9/00* (2018.01)

(52) U.S. Cl.
CPC ........ *A01G 9/026* (2013.01); *A01G 2009/003* (2013.01)

(58) Field of Classification Search
CPC ..... A01G 2009/003; A01G 9/02; A01G 9/026
USPC ...................... 47/65.5, 65.7, 66.1, 66.3, 66.4
See application file for complete search history.

(56) References Cited

U.S. PATENT DOCUMENTS 333,643 A 1/1886 Lewis
402,722 A 5/1889 Cook
404,585 A 6/1889 Wright
437,565 A 9/1890 Byrne
448,143 A 3/1891 Piper
473,836 A 4/1892 Goodacre
548,763 A 10/1895 Simpson
610,156 A 8/1898 Mechwart
797,175 A 8/1905 Collenburg
861,046 A 7/1907 Norum
1,031,713 A 7/1912 Hills
1,113,350 A * 10/1914 Inman .................... A01G 9/102 229/4.5
1,192,824 A 7/1916 Bohlman
1,201,823 A 10/1916 Holtke
2,140,932 A 12/1938 Avery
2,140,996 A 12/1938 Heifetz
2,594,307 A 4/1952 Valenzuela
2,656,969 A 10/1953 Kvasnok et al.
2,758,419 A 8/1956 Schmitz
2,968,124 A 1/1961 Coplen
3,132,791 A 5/1964 Haysler et al.
(Continued)

*Primary Examiner* — David J Parsley
(74) *Attorney, Agent, or Firm* — Barich IP Law Group

(57) ABSTRACT

A potting system and method are provided in which a flexible pot side includes two sets of bottom panel apertures, each set receiving tabs from a bottom panel. The potting system is assembled by positioning mutually engaging panel mesh structures on the bottom panels while folding the flexible pot side so that a plurality of first lacing apertures aligns with a plurality of second lacing apertures, and then inserting a pull lace through the aligned apertures to mechanically interlock them. Additionally, the pot system may be easily disassembled by disengaging the pull lace from the lacing apertures which causes the pot side to unbend and allows the bottom panel tabs to disengage. The pot system may then be reassembled by reengaging the bottom panels, repositioning the lacing apertures and inserting the pull lace.

20 Claims, 18 Drawing Sheets

(56) References Cited

U.S. PATENT DOCUMENTS

| | | | | | |
|---|---|---|---|---|---|
| 3,313,333 | A | | 4/1967 | Lordi | |
| 3,550,662 | A | * | 12/1970 | Remke | A01G 23/043 383/107 |
| 3,634,970 | A | * | 1/1972 | Williams | A01G 23/04 206/522 |
| D226,279 | S | | 2/1973 | Eyerly | |
| 4,216,622 | A | | 8/1980 | Hollenbach et al. | |
| 4,628,634 | A | | 12/1986 | Anderson | |
| 4,813,177 | A | | 3/1989 | Brilliande | |
| 5,099,608 | A | | 3/1992 | Casey | |
| 5,359,809 | A | | 11/1994 | Johnson | |

* cited by examiner

REUSABLE POTTING SYSTEMS AND METHODS

CROSS-REFERENCE TO RELATED APPLICATIONS

The present application claims the benefit of U.S. Provisional Application No. 62/040,734, filed Aug. 22, 2014, entitled "Re-Pot", which is hereby incorporated by reference in its entirety.

BACKGROUND OF THE INVENTION

The present invention generally relates to a potting system. More particularly, the present invention relates to a potting system providing easy assembly and reassembly, as well as the ability to perform in-ground disassembly and removal.

Numerous designs for potting systems for plants have been known for some time. For example, prior art potting systems include those shown in U.S. Pat. Nos. 333,643, 437,565, 448,143, 797,175, 861,046, 1,192,824, 2,140,932, 3,132,791, and 4,216,622, 4,813,177. However, the prior art potting systems fail to provide one or more of the advantages of the present potting system discussed below.

BRIEF SUMMARY OF THE INVENTION

One or more of the embodiments of the present invention provide a potting system and method including a bendable pot side having a plurality of first lacing apertures, a plurality of second lacing apertures, at least one first bottom panel aperture, and at least one second bottom panel aperture; a first bottom panel having at least one first bottom panel tab and a first bottom panel mesh structure; a second bottom panel having at least one second bottom panel tab and a second bottom panel mesh structure; and a pull lace having a lace insert portion, wherein the potting system is assembled by inserting the at least one first bottom panel tab is into the at least one first bottom panel aperture and inserting the at least one second bottom panel tab into the at least one second bottom panel aperture, engaging the first bottom panel mesh structure is with the second bottom panel mesh structure, bending the pot side so that the plurality of first lacing apertures align with the plurality of second lacing apertures, and inserting the lace insert portion of the pull lace through the plurality of first lacing apertures and the plurality of second lacing apertures.

Additionally, the pot system may be easily disassembled by disengaging the pull lace from the lacing apertures which causes the pot side to unbend and allows the bottom panel tabs to disengage. The pot system may then be reassembled by reengaging the bottom panels, repositioning the lacing apertures and inserting the pull lace.

DETAILED DESCRIPTION OF THE INVENTION

Figure 1:
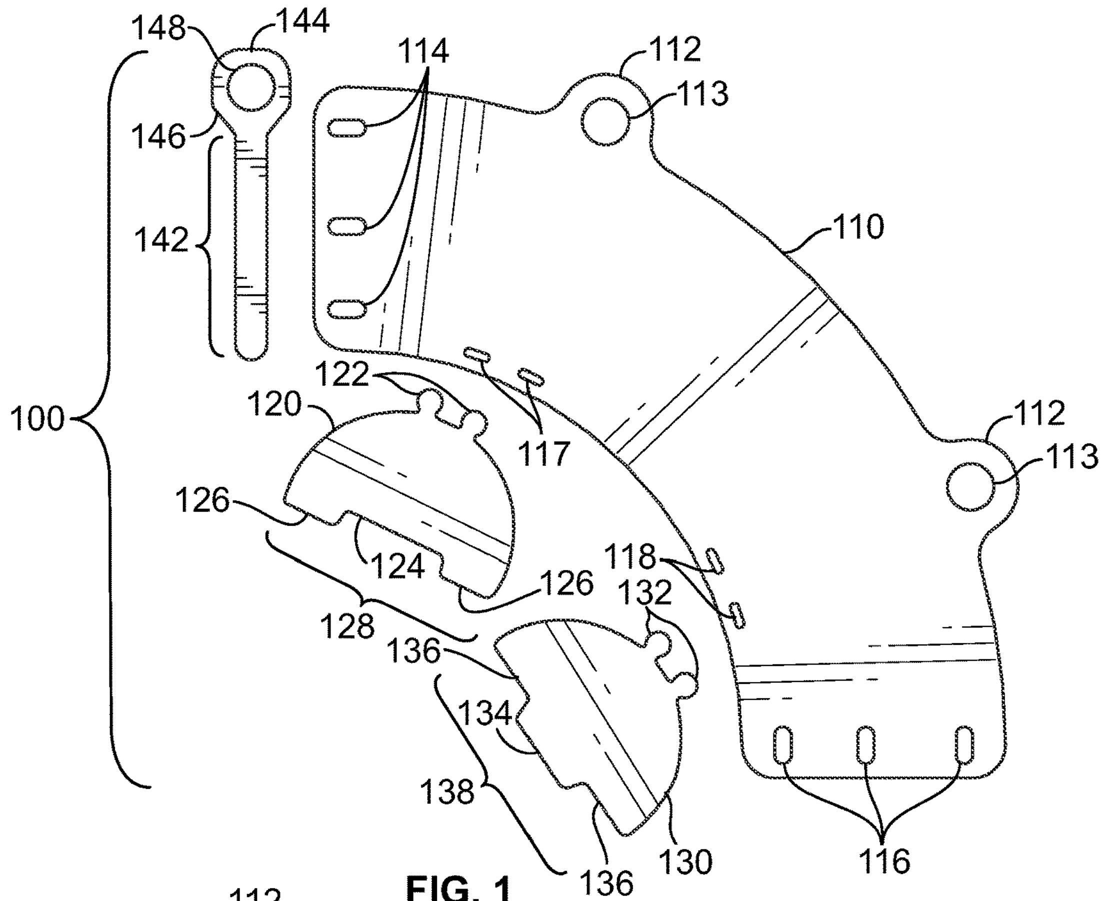
FIG. 1 illustrates a reusable potting system according to an embodiment of the present invention.

FIG. 1 illustrates a reusable potting system 100 according to an embodiment of the present invention. The reusable potting system 100 includes a flexible pot side 110, a first bottom panel 120, a second bottom panel 130, and a pull lace 140. The pot side 110 includes a plurality of lifting tabs 112, a plurality of tab grip structures 113, a plurality of first lacing apertures 114, a plurality of second lacing apertures 116, a plurality of first bottom panel apertures 117, and a plurality of second bottom panel apertures 118. The first bottom panel 120 includes a plurality of first bottom panel tabs 122 and a first bottom panel mesh structure 128 including a first bottom panel inset portion 124, and a plurality of first bottom panel extended portions 126. The second bottom panel 130 includes a plurality of second bottom panel tabs 132 and a second bottom panel mesh structure 138 including a second bottom panel extended portion 134, and a plurality of second bottom panel inset portions 136. The pull lace 140 includes a lace insert portion 142, a lace grip head 144, a pot side engagement surface 146, and a lace grip structure 148.

In operation, as further described below in FIGS. 2-10, the first bottom panel tabs 122 of the first bottom panel 120 are introduced into the first bottom panel apertures 117 of the flexible pot side 110. Next the second bottom panel tabs 132 of the second bottom panel 130 are introduced into the second bottom panel apertures 118 of the flexible pot side 110. The flexible pot side is then rolled or positioned so that the plurality of first lacing apertures 114 overlap plurality of second lacing apertures 116, while at the same time the first bottom panel mesh structure 128 of the first bottom panel 120 is brought into proximity with and meshes with the second bottom panel mesh structure 138 of the second bottom panel 130. Next, the lace insert portion 142 of the pull lace 140 is introduced through the overlapping first lacing apertures 114 and second lacing apertures 116 in an alternating fashion in order to hold the first lacing apertures 114 and second lacing apertures 116 in substantially fixed alignment relative to each other so that the interior surface of the pot side 110 describes a generally inverted frustoconical shape suitable for use as a pot. The lace insert portion 142 is typically induced through the apertures formed by the overlapping plurality of first lacing apertures 114 and second lacing apertures 116 until the pot side engagement surface 146 is brought into proximity to and/or contact with the pot side 110.

Soil and/or plant matter may then be added to the reusable potting system 100. Because the pull lace 140 maintains pot side 110 in a substantially fixed alignment and the first bottom panel 120 was meshed with the second bottom panel 130, the fixed alignment of the pot side 110 maintains the first bottom panel 120 and second bottom panel 130 in a meshed relationship, thus substantially maintaining the added soil and/or plant matter inside the potting system 100.

An additional benefit of the present potting system 100 is that it includes one or more structures that allow unwanted water to escape from the interior of the potting system and/or desired water to enter the interior of the potting system. For example, the first bottom panel apertures 117 may not be completely blocked by the insertion of the first bottom panel tabs 122 and/or the second bottom panel apertures 118 may not be completely blocked by the second bottom panel tabs 132. Thus water may pass through the unblocked portion of at least one of the first bottom panel apertures 117 and second bottom panel apertures 118. Additionally, a gap may be present between one or more of the first bottom panel 120 and second bottom panel 130 and the pot side 110 and water may pass through the gap. Additionally, a gap may be present between the first bottom panel mesh structure 128 and the second bottom panel mesh structure 138 and water may pass through the gap. Also, the pull lace 140 may not completely block the aligned first plurality of first lacing apertures 114 and plurality of second lacing apertures 116 and water may pass through the unblocked portion of the apertures.

Once soil and/or plant matter has been added to the potting system 110, the potting system may be carried or moved by engaging one or more of the plurality of tab grip structures 113 of the plurality of lifting tabs 112. In one or more embodiments, the potting system 110 itself may be planted in the ground or suspended from the lifting tabs 112. If planted in the ground, the potting system 110 may be removed from the ground by lifting the potting system using the lifting tabs 112.

At some point a user may wish to remove added soil and/or plant material from the potting system 110 or otherwise collapse or remove the potting system, for example to re-pot the plant material in a larger pot or after positioning the potting system in a hole in a desired location. At that point, the user may engage the lace grip structure 148 of the lace grip head 144. The pull lace 140 may then be induced or pulled away from the pot side 110 so that the lace insert portion 142 emerges from the apertures formed by the overlapping plurality of first lacing apertures 114 and second lacing apertures 116. Once the pull lace 140 has been removed, the pot side 110 may be manually induced away from the soil and /or plant matter inside the potting system, thus inducing the plurality of first lacing apertures 114 and second lacing apertures 116 out of alignment. Further, as the plurality of first lacing apertures 114 and second lacing apertures 116 are brought out of alignment, the first bottom panel 120 and second bottom panel 130 become disengaged so that the first bottom panel mesh structure 128 is no longer held in substantially fixed alignment with the second bottom panel mesh structure 138. The potting system 100 may then be removed by engaging one or more of the plurality of lifting tabs 112 and inducing the potting system upwards away from the ground. As the potting system 100 is induced upwards, the first bottom panel 120 and second bottom panel 130 (no longer being held in alignment by the fixed position of the lower end of the pot side 110), become disengaged from each other, are displaced vertically downward, and allow the soil and/or plant matter inside the potting system 100 to pass through the bottom of the potting system. The potting system 100 may thus be removed from the soil and/or plant matter that it previously contained. The potting system may then be reused by again positioning the first bottom panel 120 and second bottom panel 130 in a meshed configuration, positioning the pot side 110 so that the plurality of first lacing apertures 114 and second lacing apertures 116 again overlap, and then passing the pull lace 140 again through those apertures.

Figure 2:
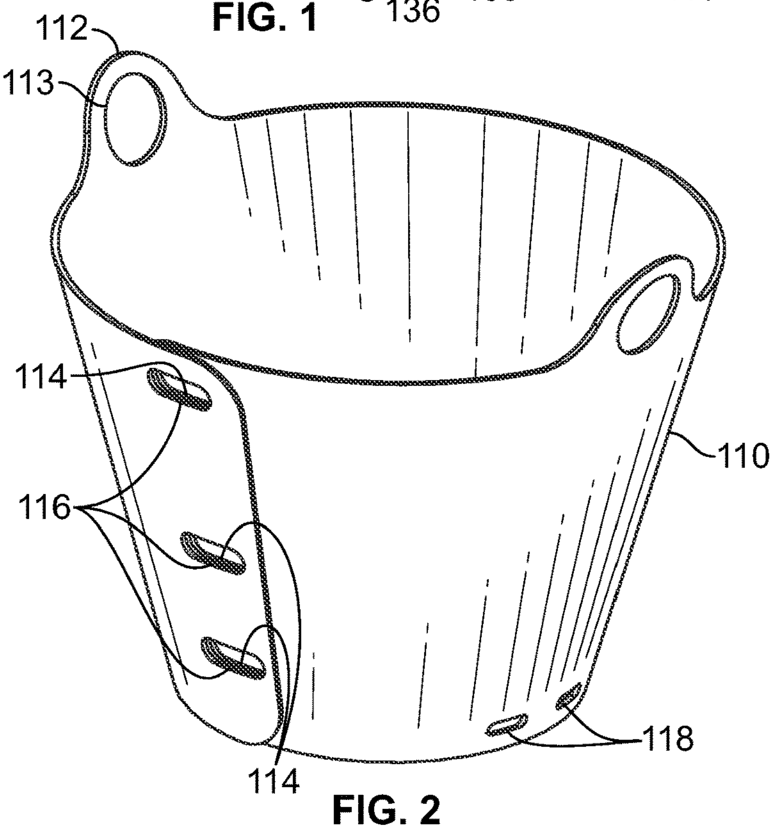
FIG. 2 illustrates a perspective view of the pot side positioned so that the plurality of first lacing apertures and plurality of second lacing apertures overlap.

FIG. 2 illustrates a perspective view of the pot side 110 positioned so that the plurality of first lacing apertures 114 and plurality of second lacing apertures 116 overlap. As discussed above, the pull lace 140 may then be passed through the plurality of first lacing apertures 114 and plurality of second lacing apertures 116.

Also shown are the plurality of bottom panel apertures 118, plurality of lifting tabs 112 and plurality of tab grip structures 113. As discussed above, the second bottom panel tabs 132 may be positioned in the tab grip structures 113 to attach the second bottom panel 130 to the pot side 110.

As shown in FIG. 2, in the present embodiment, the tab grip structures 113 may be holes in the lifting tabs 113. Alternatively, the tab grip structures 113 may be a solid portion of the tab and may include a gripping structure such as raised or lowered surfaces, including a pattern of lines or other shapes. Additionally, instead of having a single hole, the tab grip structure 113 may be composed of a plurality of holes or may include a combination of holes and/or raised or lowered structures.

Also, as shown in FIG. 2, the pot side 110 is composed of a flexible material that permits it to be positioned in the generally inverted frustoconical shape shown. Thus, in one embodiment, the pot side may be composed of plastic, fabric, metallic sheeting, or other flexible and/or bendable material. Additionally, the pot side may be composed of a plurality of flexible materials. For example, the pot side may have a first layer composed of plastic and an additional layer composed of a metallic sheet positioned on the inside and/or outside of the plastic layer. Additionally, the bottom panels may be rigid structures or structures of lesser flexibility than the pot side Additionally, the material of the pot side, pull lace, and/or bottom panels may be any of transparent, translucent, or opaque.

Figure 3:
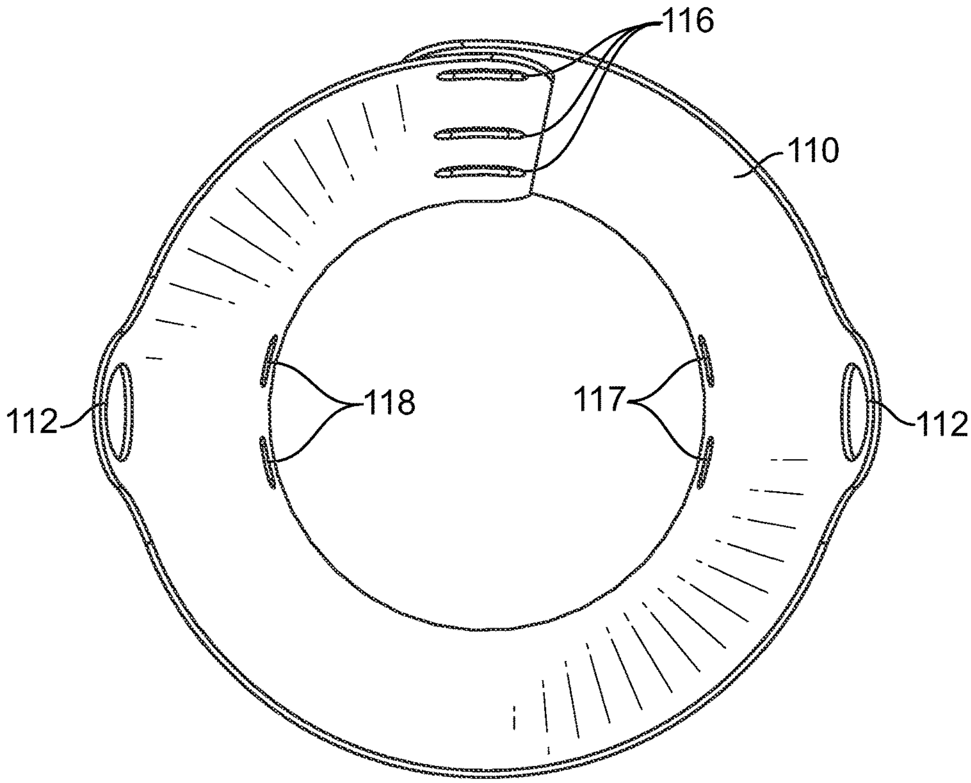
FIG. 3 illustrates a top view of the pot side of FIG. 2 positioned so that the plurality of first lacing apertures and plurality of second lacing apertures overlap.

FIG. 3 illustrates a top view of the pot side 110 of FIG. 2 positioned so that the plurality of first lacing apertures and plurality of second lacing apertures 116 overlap. FIG. 3 also shows the lifting tabs 112, the plurality of first bottom panel apertures 117 and the plurality of second bottom panel apertures 118.

Figure 4:
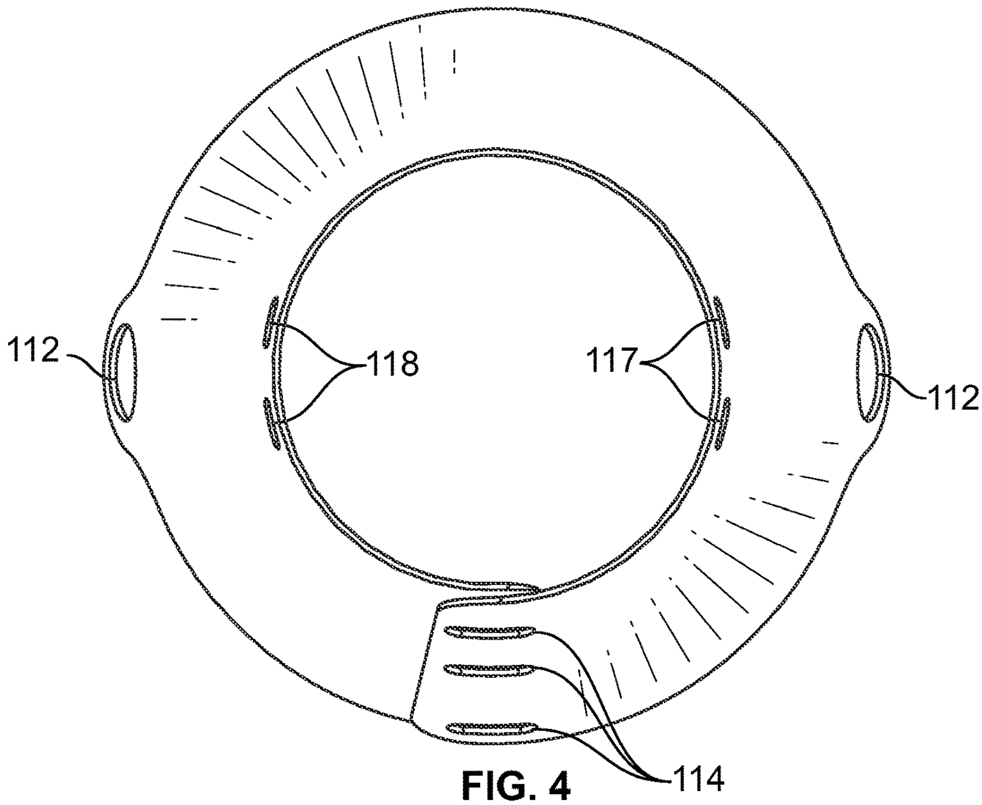
FIG. 4 illustrates a bottom view of the pot side of FIGS. 2 and 3 positioned so that the plurality of first lacing apertures and plurality of second lacing apertures overlap.

FIG. 4 illustrates a bottom view of the pot side 110 of FIGS. 2 and 3 positioned so that the plurality of first lacing apertures 114 and plurality of second lacing apertures overlap. FIG. 4 also shows the lifting tabs 112, the plurality of first bottom panel apertures 117 and the plurality of second bottom panel apertures 118.

Figure 5:
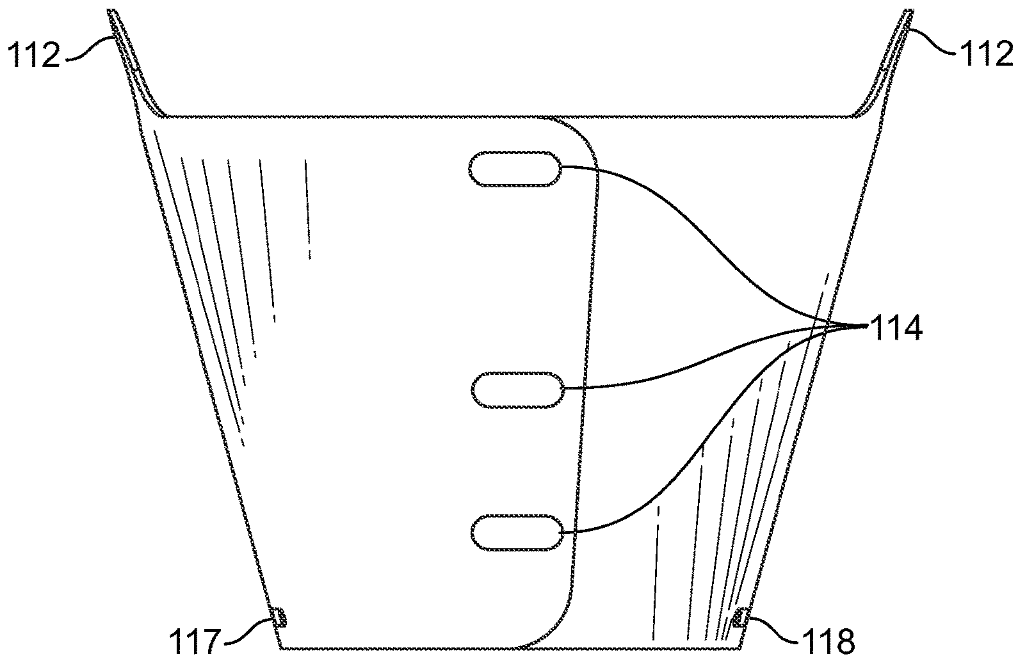
FIG. 5 illustrates a side elevational view of the pot side of FIGS. 2-4 positioned so that the plurality of first lacing apertures and plurality of second lacing apertures overlap.

FIG. 5 illustrates a side elevational view of the pot side 110 of FIGS. 2-4 positioned so that the plurality of first lacing apertures 114 and plurality of second lacing apertures overlap. FIG. 5 also shows the lifting tabs 112, a first bottom panel aperture 117 and a second bottom panel aperture 118.

Figure 6:
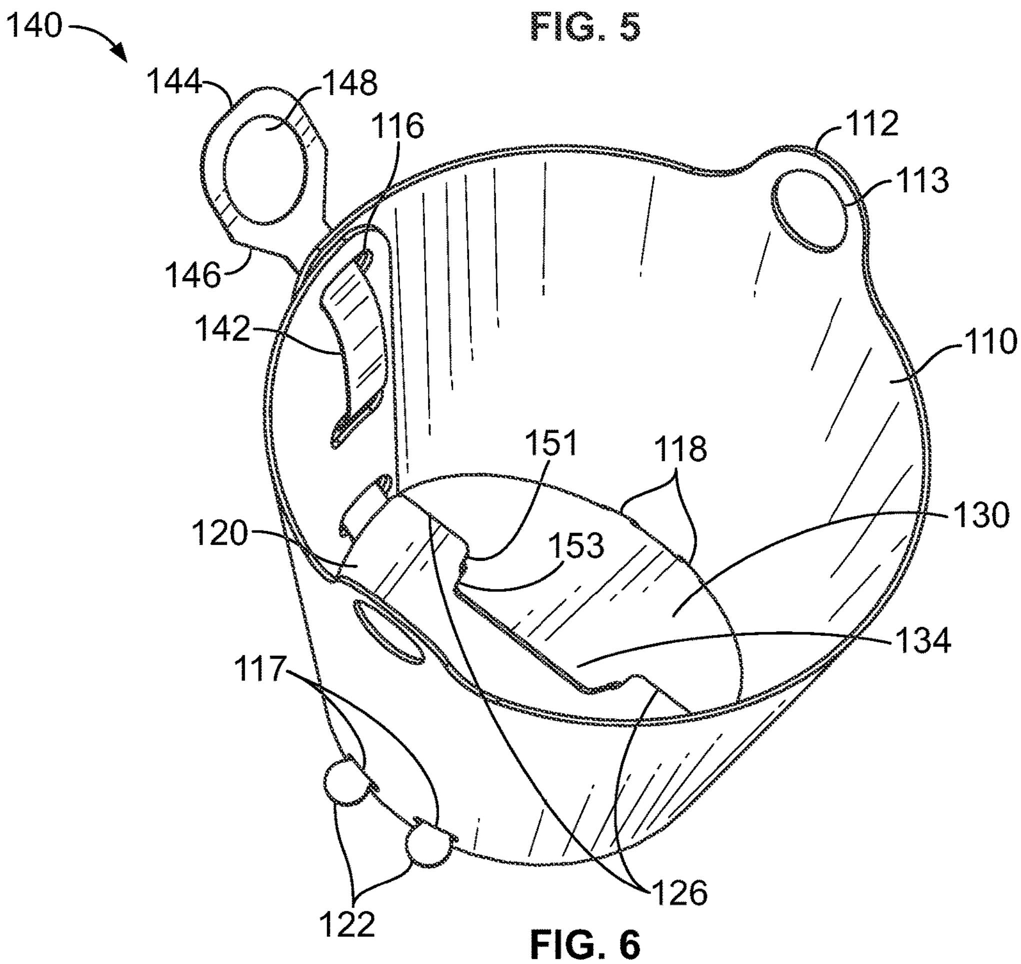
FIG. 6 illustrates a perspective view of the potting system of FIG. 1 in its assembled configuration.

FIG. 6 illustrates a perspective view of the potting system 100 of FIG. 1 in its assembled configuration. FIG. 6 shows the flexible pot side 110, first bottom panel 120, second bottom panel 130, pull lace 140, plurality of lifting tabs 112, plurality of tab grip structures 113, plurality of second lacing apertures 116, plurality of first bottom panel apertures 117, plurality of second bottom panel apertures 118, plurality of first bottom panel tabs 122, plurality of first bottom panel extended portions 126, second bottom panel extended portion 134, pull lace 140, lace insert portion 142, lace grip head 144, pot side engagement surface 146, and the lace grip structure 148.

As discussed above and shown in FIG. 6, the first bottom panel 120 and second bottom panel 130 are in a meshed configuration wherein the plurality of first bottom panel extended portions 126 are positioned over and may engage with the second bottom panel inset portions 136 while the first bottom panel inset portion 124 is positioned under and may engage with the second bottom panel extended portion 134. Additionally, lateral shift of the first bottom portion relative to the second bottom portion may be constrained by the inner surface 151 of one or more of the first bottom panel extended portions coming into contact with the outer surface 153 of the second bottom panel extended portion 134. Additionally, lateral shift of the first bottom portion relative to the second bottom portion may be constrained by one or more of the bottom portions contacting the inner portion of the pot side.

Also, the first bottom panel 130 and second bottom panel 140 are attached to or engaged with the pot side 110 by the insertion of the first bottom panel tabs 122 through the first bottom panel apertures 117 and the similar structure shown in FIG. 1 for the second bottom panel. In one embodiment, the sizing of the first bottom panel apertures and second bottom panel apertures relative to their respective tabs is such that the tabs are somewhat compressible but are greater in horizontal extent than the width of their respective apertures. Thus, the tabs are introduced through apertures with sufficient force to partially compress the tabs and once the tabs pass through their apertures, they expand so that they are mechanically engages with the pot side. Alternatively, one or more of the bottom panels may be incompressible and the pot side may be composed of a compressible material that permits the bottom panels to be introduced. As a further alternative, both the bottom panels and the pot side may be composed of a compressible material.

Additionally, as discussed above, the pull lace 140 passes through the apertures formed by the overlap of the plurality of first lacing apertures 114 and plurality of second lacing apertures in order to substantially fix the positions of the plurality of first lacing apertures 114 and plurality of second lacing apertures relative to each other. Thus, because the positions of the apertures 114, 116 are substantially fixed and the positions of the bottom panel apertures 117, 118 are fixed in the pot side 110, the relative positions of the first bottom panel 120 and second bottom panel 130 are substantially fixed in their meshed configuration as shown in FIG. 7.

Figure 7:
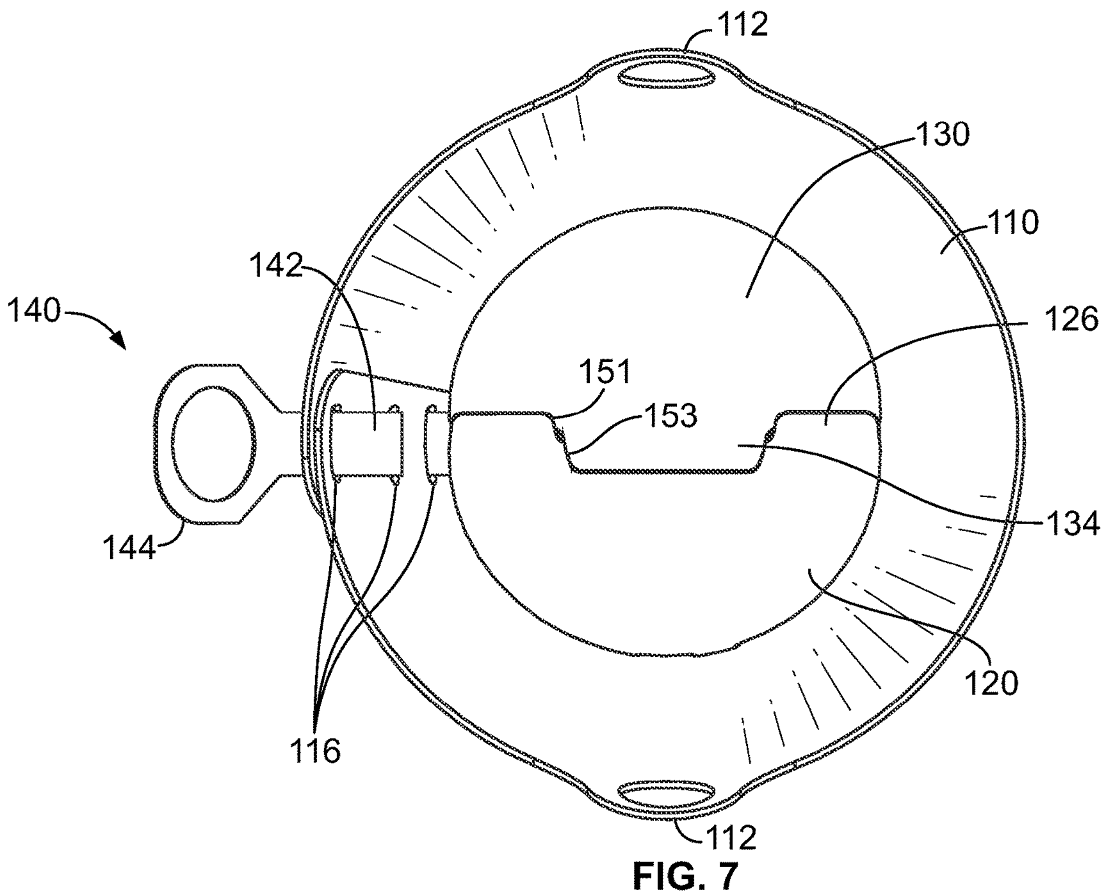
FIG. 7 illustrates a top view of the assembled potting system of FIG. 6.

FIG. 7 illustrates a top view of the assembled potting system of FIG. 6. FIG. 7 shows the flexible pot side 110, first bottom panel 120, second bottom panel 130, pull lace 140, plurality of lifting tabs 112, plurality of second lacing apertures 116, plurality of first bottom panel extended portions 126, second bottom panel extended portion 134, pull lace 140, lace insert portion 142, lace grip head 144, pot side engagement surface 146, inner surface 151 of the first bottom panel extended portion, and the outer surface 153 of the second bottom panel extended portion.

Figure 8:
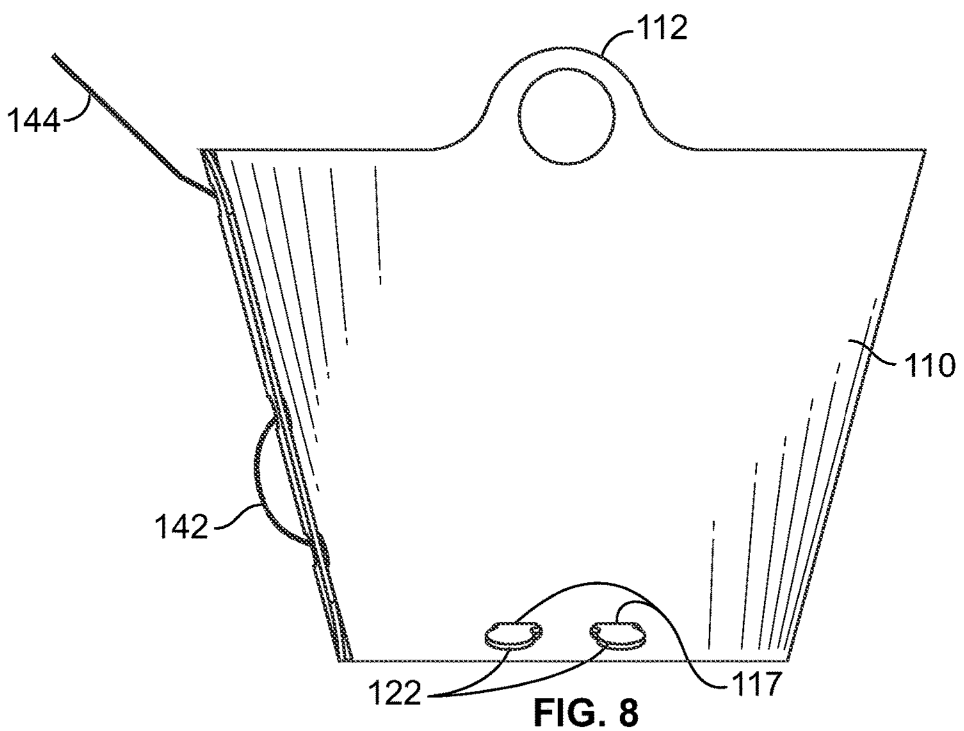
FIG. 8 illustrates a first side view of the assembled potting system of FIG. 6.

FIG. 8 illustrates a first side view of the assembled potting system of FIG. 6. FIG. 8 shows the pot side 110, lifting tabs 112, plurality of first bottom panel apertures 117, plurality of first bottom panel tabs 122, lace grip head 144 and lace insert portion 142.

Figure 9:
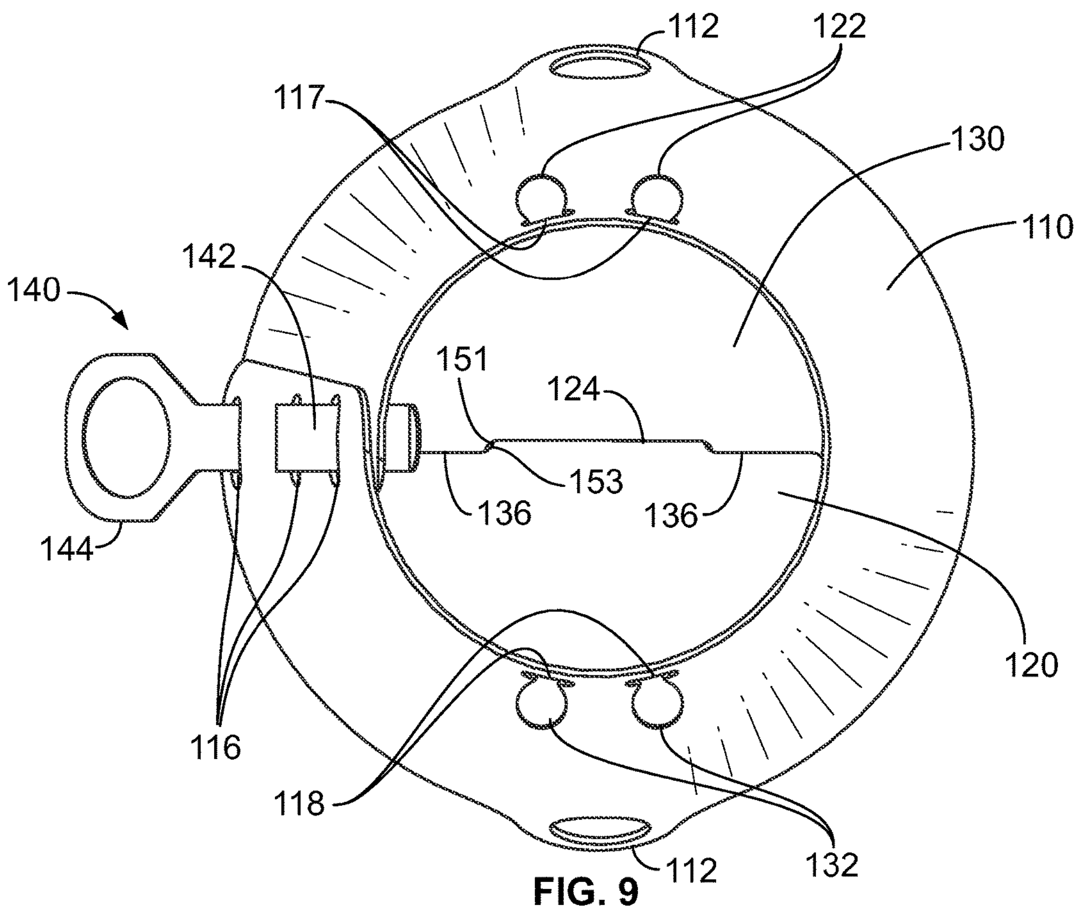
FIG. 9 illustrates a bottom view of the assembled potting system of FIG. 6.

FIG. 9 illustrates a bottom view of the assembled potting system of FIG. 6. FIG. 9 shows the pot side 110, first bottom panel 120, second bottom panel 130, pull lace 140, plurality of lifting tabs 112, plurality of second lacing apertures 116, plurality of first bottom panel apertures 117, plurality of second bottom panel apertures 118, plurality of first bottom panel tabs 122, plurality of second bottom panel tabs 132, plurality of second bottom panel inset portions 136, first bottom panel extended portion 124, pull lace 140, lace insert portion 142, lace grip head 144, inner surface 151 of the first bottom panel extended portion, and the outer surface 153 of the second bottom panel extended portion.

Figure 10:
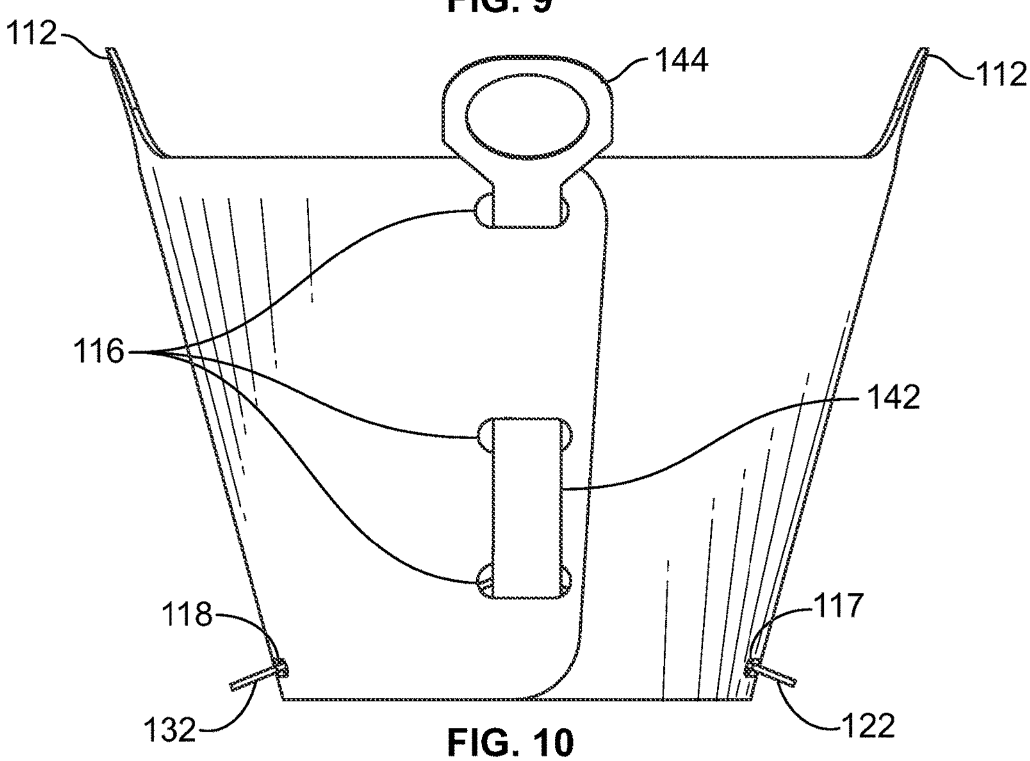
FIG. 10 illustrates a second side view of the assembled potting system of FIG. 6.

FIG. 10 illustrates a second side view of the assembled potting system of FIG. 6. FIG. 10 shows the pot side 110, lifting tabs 112, the first bottom panel aperture 117, the first bottom panel tab 122, the second bottom panel aperture 118, the plurality of second lacing apertures 116, the second bottom panel tab 132, lace grip head 144 and the lace insert portion 142.

Figures 11, 12, 13:
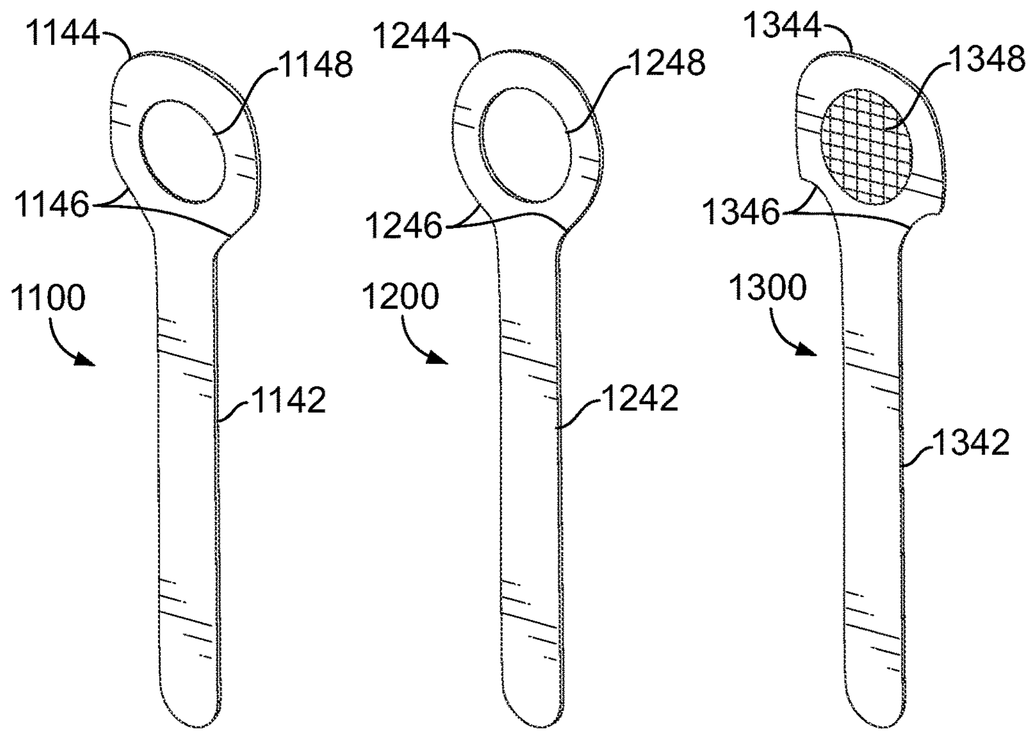
FIG. 11 illustrates a first embodiment of the pull lace of FIG. 1.
FIG. 12 illustrates a second embodiment of the pull lace of FIG. 1.
FIG. 13 illustrates a third embodiment of the pull lace of FIG. 1.

FIGS. 11-13 illustrate embodiments of the pull lace 140 of FIG. 1. More specifically, FIG. 11 illustrates a first embodiment 1100 of the pull lace 140 of FIG. 1. As shown in FIG. 11, the first embodiment 1100 of the pull lace includes the lace insert portion 1142, lace grip head 1144, pot side engagement surface 1146, and lace grip structure 1148. As shown in FIG. 11, the pot side engagement surface 1146 forms an angled transition between the lace insert portion 1143 and the lace grip head 1144. Additionally, the lace grip structure 1148 includes a hole in the material comprising the lace grip head 1144.

FIG. 12 illustrates a second embodiment 1200 of the pull lace 140 of FIG. 1. As shown in FIG. 12, the second embodiment 1200 of the pull lace includes the lace insert portion 1242, lace grip head 1244, pot side engagement surface 1246, and lace grip structure 1248. As shown in FIG. 12, the pot side engagement surface 1246 forms an arced or hemispherical transition between the lace insert portion 1243 and the lace grip head 1244. Also, the lace grip head 1244 is configured to be circular, but may alternatively be oval. Similar to the embodiment of FIG. 11, the lace grip structure 1248 includes a hole in the material comprising the lace grip head 1244.

FIG. 13 illustrates a third embodiment 1300 of the pull lace 140 of FIG. 1. As shown in FIG. 13, the third embodiment 1300 of the pull lace includes the lace insert portion 1342, lace grip head 1344, pot side engagement surface 1346, and lace grip structure 1348. As shown in FIG. 13, the pot side engagement surface 1346 forms an outwardly arced transition between the lace insert portion 1343 and the lace grip head 1344. Also, the lace grip head 1244 is configured to be generally horseshoe-shaped. Also, as different from the lace grip structures of FIGS. 11 and 12, the lace grip structure 1348 includes a circular region having a cross-hatched or textured pattern of raised and/or lowered material in order to improve grip.

Comparing the embodiments of FIGS. 11-13, the circular lace grip head 1244 of FIG. 12 may be preferred in embodiments where minimal of the lace grip head to the surrounding material such as soil is desired. Alternatively, the lace grip heads 1144, 1344 of FIGS. 11 and 13 may provide for greater strength of the lace grip head, especially the lace grip head of FIG. 13 which includes materials at its center rather than an aperture. Additionally, the outwardly arced transition between of FIG. 13 may be preferable in embodiments where a more precise stopping point for the insertion of the pull lace is desired.

In additional alternatives, the head of the pull lace may be composed of other shapes such as squares or rectangles. Additionally, the transition between the lace insert portion and the lace grip head may be flat. Further any embodiment of the pull lace may be combined with any other embodiment of other portions of the potting system discussed herein.

Figure 14:
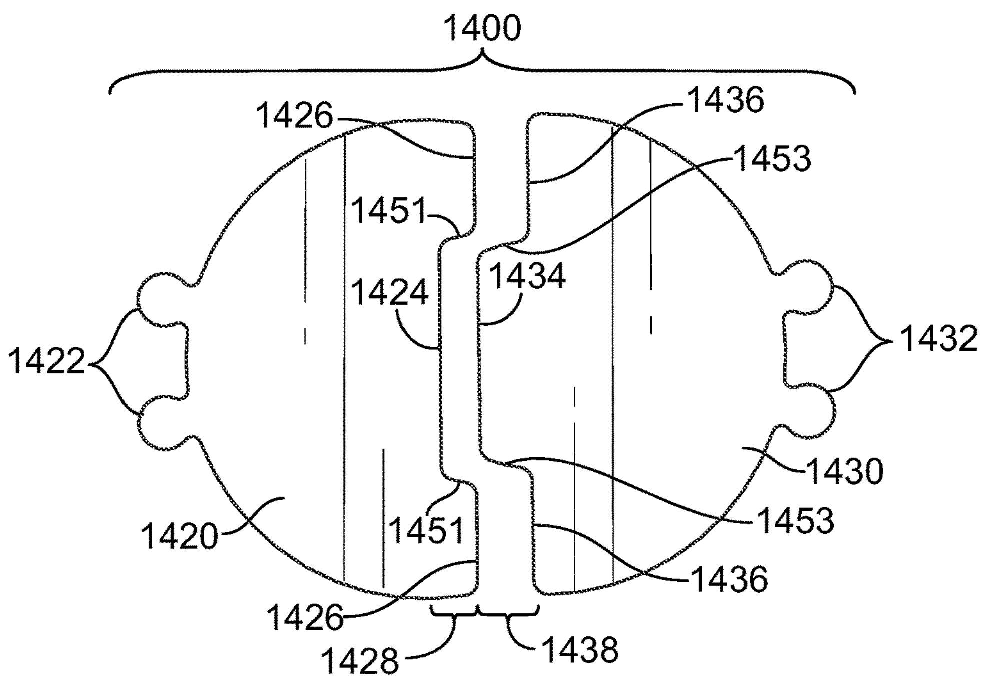
FIG. 14 illustrates a first embodiment of the first bottom panel and second bottom panel of FIG. 1.

FIG. 14-18 illustrate embodiments of the first bottom panel 120 and second bottom panel 130 of FIG. 1. More specifically, FIG. 14 illustrates a first embodiment 1400 of the first bottom panel 120 and second bottom panel 130 of FIG. 1. As shown in FIG. 14, the first embodiment 1400 of the first bottom panel 120 and second bottom panel 130 includes the plurality of first bottom panel tabs 1422, the first bottom panel mesh structure 1428 including the first bottom panel inset portion 1424, and plurality of first bottom panel extended portions 1426, the plurality of second bottom panel tabs 1432, the second bottom panel mesh structure 1438 including the second bottom panel extended portion 1434 and plurality of second bottom panel inset portions 1436, the inner surfaces 1451 of the first bottom panel extended portions, and the outer surfaces 1453 of the second bottom panel extended portion.

As described above, the first bottom panel mesh structure 1428 and the second bottom panel mesh structure 1438 mesh together with the second bottom panel extended 1434 portion passing over the first bottom panel inset portion 1424 and the first bottom panel extended portions 1426 passing over the second bottom panel inset portions 1436.

Figure 15A:
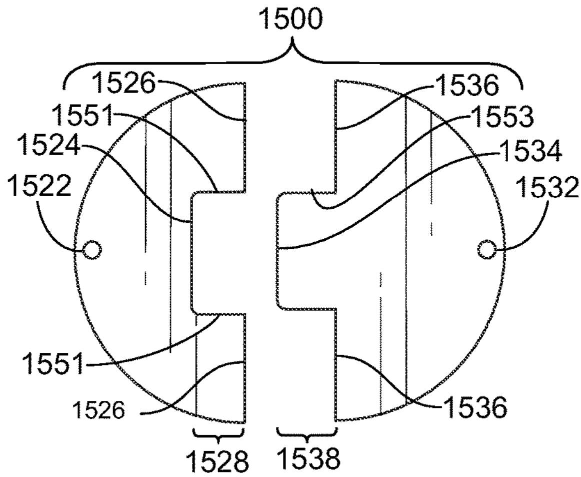
FIG. 15A illustrates a second embodiment of the first bottom panel 120 and second bottom panel of FIG. 1.

FIG. 15A illustrates a second embodiment 1500 of the first bottom panel 120 and second bottom panel 130 of FIG. 1. As shown in FIG. 15, the second embodiment 1500 of the first bottom panel 120 and second bottom panel 130 includes a first bottom panel attachment structure 1522, the first bottom panel mesh structure 1528 including the first bottom panel inset portion 1524, and plurality of first bottom panel extended portions 1526, a second bottom attachment structure 1532, the second bottom panel mesh structure 1538 including the second bottom panel extended portion 1534 and plurality of second bottom panel inset portions 1536, the inner surfaces 1551 of the first bottom panel extended portions, and the outer surfaces 1553 of the second bottom panel extended portion.

Similar to the embodiment of FIG. 14, the first bottom panel mesh structure 1528 and the second bottom panel mesh structure 1538 mesh together with the second bottom panel extended 1534 portion passing over the first bottom panel inset portion 1524 and the first bottom panel extended portions 1526 passing over the second bottom panel inset portions 1536. Advantages of the embodiment of FIG. 15 may include that the first bottom panel extended portions and second bottom panel extended portions are elongated relative to the embodiment of FIG. 14. This may produce a stronger mesh of the bottom panels and thus be more suitable for a potting system that is designed for heavier loads of soil and/or plant matter. Additionally, the surfaces 1551, 1553 are substantially flat rather than angled which may provide for greater lateral stability, which may also be desirable in a potting system that is larger and/or designed for carrying heavier loads.

Figure 20:
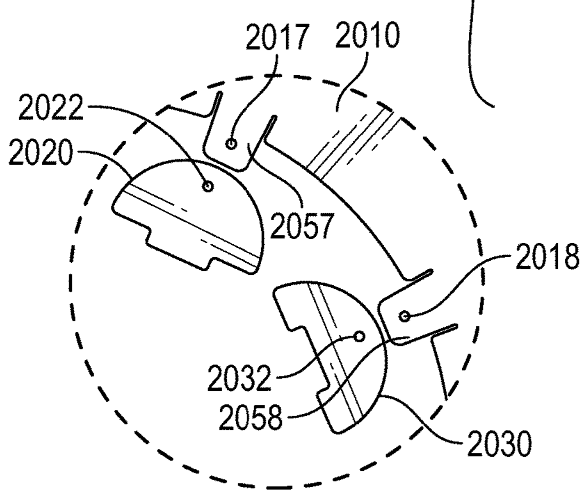
FIG. 20 illustrates an alternative connection system for connecting the first bottom panel and second bottom panel to the pot side.

Additionally, the first bottom panel attachment structure 1522 and second bottom panel attachment structure 1532 are further shown and discussed in FIG. 20.

Figure 15B:
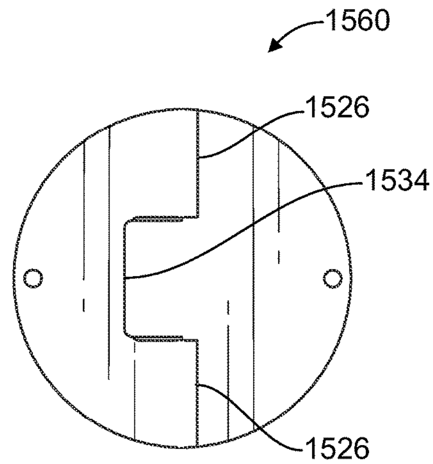
FIG. 15B illustrates the embodiment of FIG. 15A in its meshed configuration with the second bottom panel extended portion passing over the first bottom panel inset portion and the first bottom panel extended portions passing over the second bottom panel inset portions.

FIG. 15B illustrates the embodiment of FIG. 15A in its meshed configuration with the second bottom panel extended 1534 portion passing over the first bottom panel inset portion 1524 and the first bottom panel extended portions 1526 passing over the second bottom panel inset portions 1536.

Figure 16:
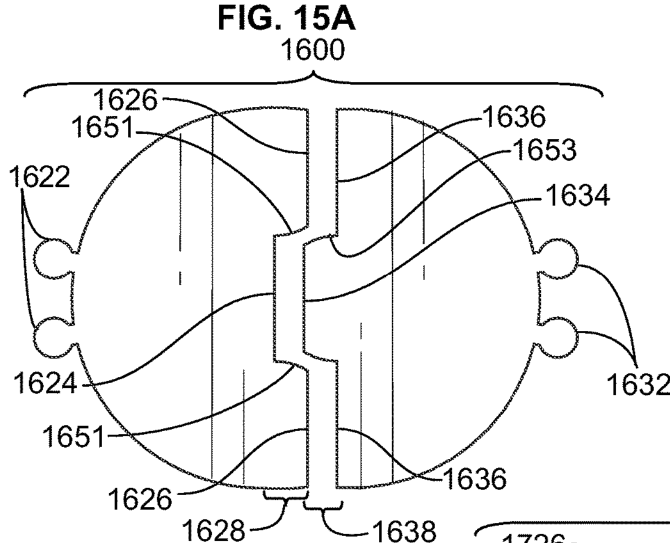
FIG. 16 illustrates a third embodiment of the first bottom panel and second bottom panel of FIG. 1.

FIG. 16 illustrates a third embodiment 1600 of the first bottom panel 120 and second bottom panel 130 of FIG. 1. As shown in FIG. 16, the third embodiment 1600 of the first bottom panel 120 and second bottom panel 130 includes the plurality of first bottom panel tabs 1622, the first bottom panel mesh structure 1628 including the first bottom panel inset portion 1624, and plurality of first bottom panel extended portions 1626, the plurality of second bottom panel tabs 1632, the second bottom panel mesh structure 1638 including the second bottom panel extended portion 1634 and plurality of second bottom panel inset portions 1636, the inner surfaces 1651 of the first bottom panel extended portions, and the outer surfaces 1653 of the second bottom panel extended portion.

Similar to the embodiment of FIG. 14, the first bottom panel mesh structure 1628 and the second bottom panel mesh structure 1638 mesh together with the second bottom panel extended 1634 portion passing over the first bottom panel inset portion 1624 and the first bottom panel extended portions 1626 passing over the second bottom panel inset portions 1636. However, advantages of the embodiment of FIG. 16 include that the inner surfaces 1651 of the first bottom panel extended portions, and the outer surfaces 1653 of the second bottom panel extended portion are configured as an arc, spherical segment, or oval segment. This embodiment may provide for an easier release of the first and second bottom panels because of the arced rather than flat or angled configuration.

Figure 17:
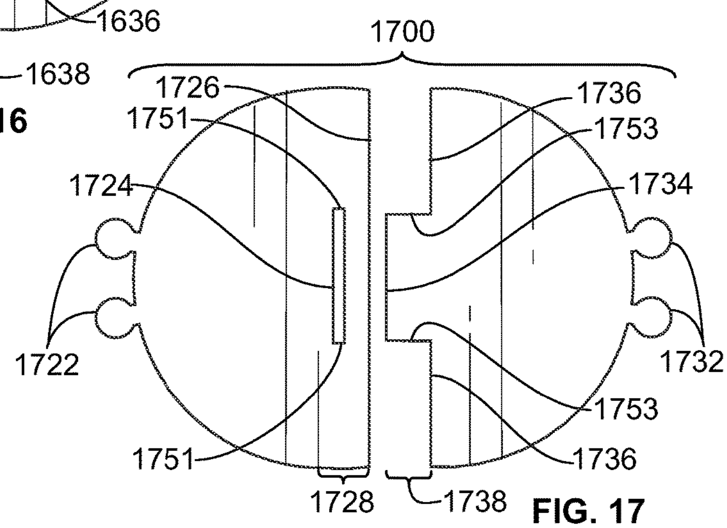
FIG. 17 illustrates a fourth embodiment of the first bottom panel and second bottom panel of FIG. 1.

FIG. 17 illustrates a fourth embodiment 1700 of the first bottom panel 120 and second bottom panel 130 of FIG. 1. As shown in FIG. 17, the fourth embodiment 1700 of the first bottom panel 120 and second bottom panel 130 includes the plurality of first bottom panel tabs 1722, the first bottom panel mesh structure 1728 including the first bottom panel insert slot 1724, and a substantially flat first bottom panel mesh face 1726, the plurality of second bottom panel tabs 1732, the second bottom panel mesh structure 1738 including the second bottom panel extended portion 1734 and plurality of second bottom panel inset portions 1736, the inner surfaces 1751 of the first bottom panel insert slot, and the outer surfaces 1753 of the second bottom panel extended portion.

While the second bottom panel extended portion 1734 of FIG. 17 may be generally similar to the second bottom panel extended portion 1534 of FIG. 15, the first bottom panel of FIG. 17 instead includes the first bottom panel insert slot 1724. In the embodiment of FIG. 17, to mesh the first and second bottom panels, the second bottom panel extended portion 1534 is introduced into the first bottom panel insert slot 1724 so that the second bottom panel extended portion 1534 is positioned above the first bottom panel. In this configuration, the first bottom panel mesh face is positioned above the second bottom panel.

Similar to the embodiments above, lateral motion of the first bottom panel relative to the second bottom panel is constrained when the inner surfaces 1751 of the first bottom panel insert slot contact the outer surfaces 1753 of the second bottom panel extended portion.

This embodiment may provide for a stronger mesh in certain applications.

Figure 18:
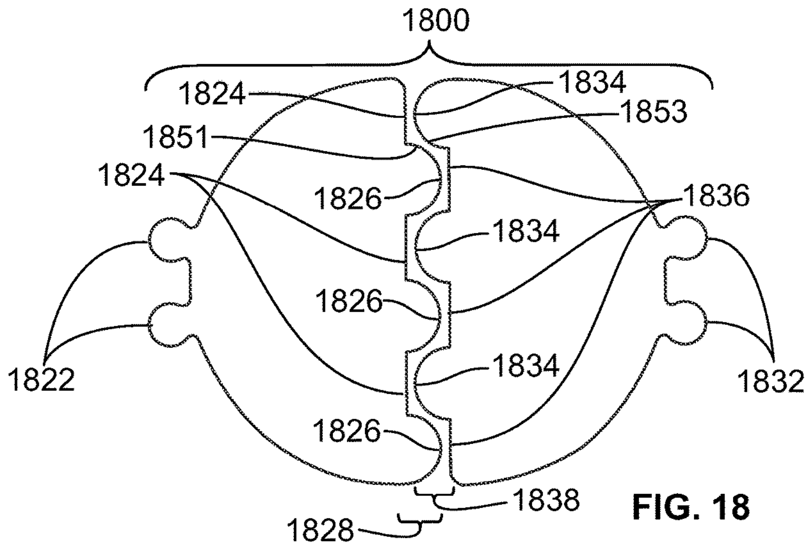
FIG. 18 illustrates a fifth embodiment of the first bottom panel and second bottom panel of FIG. 1.

FIG. 18 illustrates a fifth embodiment 1800 of the first bottom panel 120 and second bottom panel 130 of FIG. 1. As shown in FIG. 18, the fifth embodiment 1800 of the first bottom panel 120 and second bottom panel 130 includes the plurality of first bottom panel tabs 1822, the first bottom panel mesh structure 1828 including a plurality of first bottom panel inset portions 1824, and a plurality of first bottom panel extended portions 1826, the plurality of second bottom panel tabs 1832, the second bottom panel mesh structure 1838 including a plurality of second bottom panel extended portions 1834 and a plurality of second bottom panel inset portions 1836, the outer surfaces 1851 of the first bottom panel extended portions and the outer surfaces 1853 of the second bottom panel extended portions.

Similar to the embodiments above, the first bottom panel mesh structure 1828 and the second bottom panel mesh structure 1838 mesh together with the first bottom panel extended portions 1826 passing over the second bottom panel inset portions 1836 and the second bottom panel extended portions 1834 passing over the first bottom panel inset portions 1834.

FIG. 18 illustrates that both bottom panels may include extended and inset portions and that there may be multiple extended and inset portions on each panel.

Additionally, as shown in FIG. 18, the outer surfaces 1851 of the first bottom panel extended portions and the outer surfaces 1853 of the second bottom panel extended portions are arced or hemispherical in shape. This embodiment may provide for an easier release that may be desirable in smaller size potting systems.

Also, for any embodiment, the extended portions of a bottom panel may be shapes in any of the rounded trapezoidal shape shown in FIG. 14, the rounded rectilinear shape of FIG. 15, the arced, spherical, or ovoid shape of FIG. 16, the tab and slot configuration of FIG. 17, and/or the multiple, hemispherical configuration of FIG. 18. Additionally, other embodiments include straight edge trapezoid or rectilinear, multiple tabs and slots, or a meshing system combining more than one of the above. Further any embodiment of bottom panels may be combined with any other embodiment of other portions of the potting system discussed herein.

Figure 19:
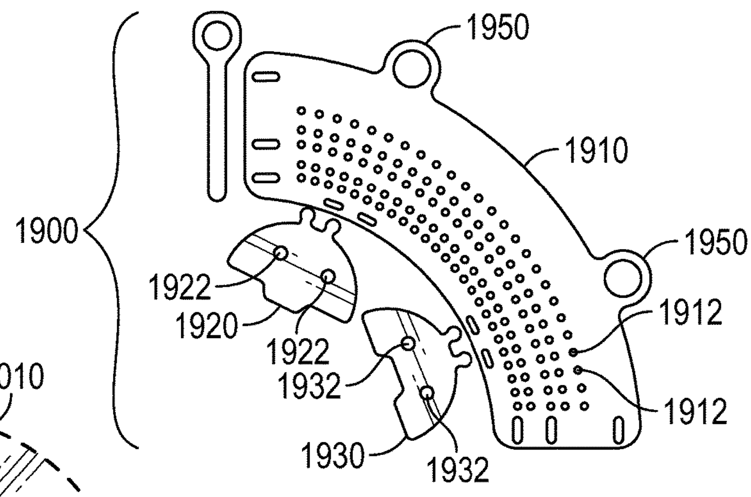
FIG. 19 illustrates and alternative embodiment of the potting system of FIG. 1 wherein the pot side and bottom panels are equipped with a plurality of water passage holes.

FIG. 19 illustrates and alternative embodiment 1900 of the potting system of FIG. 1 wherein the pot side 1910 and bottom panels 1920, 1930 are equipped with a plurality of water passage holes. As shown in FIG. 19, the pot side 1910 includes a plurality of pot side holes 1912, the first bottom panel 1920 includes a plurality of first bottom panel holes 1922, the second bottom panel 1930 includes a plurality of second bottom panel holes 1932, and a plurality of alternate lifting handles 1950 are shown.

As mentioned above, in some embodiments it is desirable that the potting system 100 includes one or more structures that allow unwanted water to escape from the interior of the potting system and/or desired water to enter the interior of the potting system. Several structures to provide this are discussed above. The embodiment of FIG. 19 provides the additional holes 1912, 1922, 1932 to increase the ability of water to enter and/or escape the potting system. Such an embodiment may be preferred for applications where greater transit of water through the potting system is desired.

Additionally, FIG. 19 illustrates the plurality of alternate lifting handles 1950. Compared to the lifting handles of FIG. 1, the alternative lifting handles 1950 of FIG. 19 can be seen to be larger in relative size and oriented at a greater distance above the top edge of the pot side 1910. This embodiment may be desired, for example, for smaller potting systems or potting systems that are more deeply buried.

FIG. 20 illustrates an alternative connection system for connecting the first bottom panel 2020 and second bottom panel 2030 to the pot side 2010. As shown in FIG. 20, the pot side 2010 includes a first pot side tab 2057 having a first pot side attachment structure 2017 and a second pot side tab 2058 having a second pot side attachment structure 2018. The first bottom panel 2020 includes a first bottom panel attachment structure 2022 and the second bottom panel 2030 includes second bottom panel attachment structure 2032. In operation, the first pot side attachment structure 2017 attaches to the first bottom panel attachment structure 2022 and the second pot side attachment structure 2018 attaches to the second bottom panel attachment structure 2032 using any of the embodiments discussed below.

In different embodiments, the bottom panels are attached to the post side using any of rivets, adhesive, ties, and/or tabs such as an insert tab on one of the bottom panel or side wall that fits into and frictionally engages an aperture or indent on the opposing structure.

Figure 21:
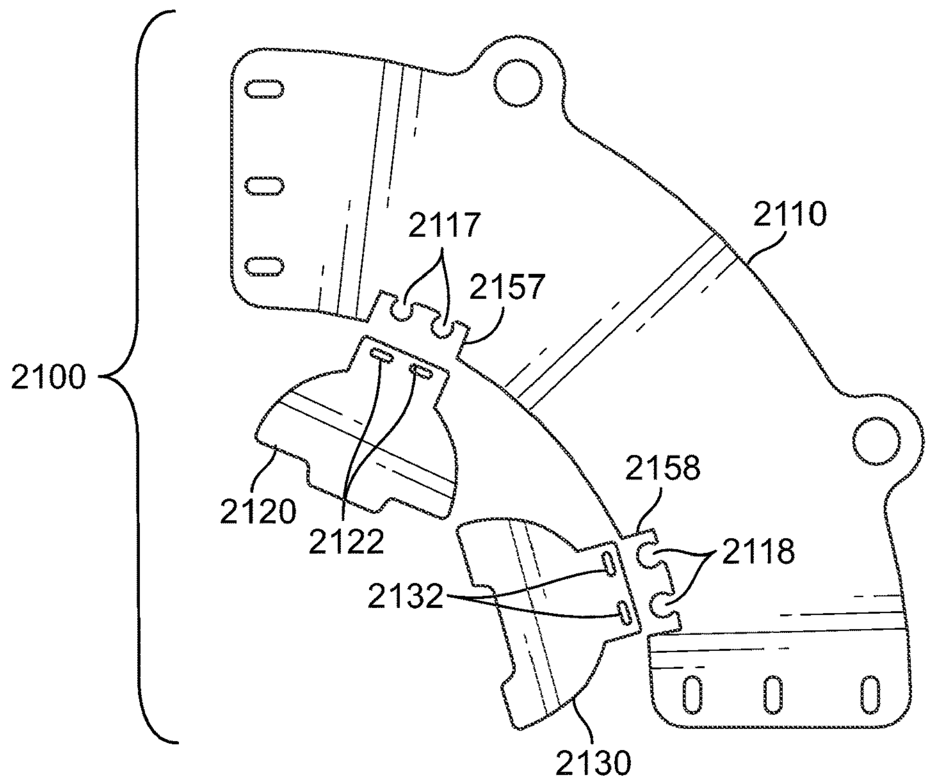
FIG. 21 illustrates an alternative slot connection system for connecting the first bottom panel and second bottom panel to the pot side.

FIG. 21 illustrates an alternative slot connection system 2100 for connecting the first bottom panel 2120 and second bottom panel 2130 to the pot side 2110. As shown in FIG. 21, the pot side 2110 includes a plurality of first bottom panel tabs 2117 positioned in a first bottom panel insert 2157 and a plurality of second bottom panel tabs 2118 positioned in a second bottom panel insert 2158. The first bottom panel 2120 includes a plurality of first bottom panel apertures 2122. The second bottom panel 2130 includes a plurality of second bottom panel apertures 2132.

In operation, the first and second bottom panels 2120, 2130 are attached to the pot side 2110 by inserting the plurality of first bottom panel tabs 2117 into the plurality of first bottom panel apertures 2122 and inserting the plurality of second bottom panel tabs 2118 into the plurality of second bottom panel apertures 2132.

The first and second bottom panel tabs 2117, 2118 may be positioned in the first and second bottom panel inserts 2158, 2158 so that the first and second bottom panel tabs 2117, 2118 do not protrude beyond the bottom edge of the pot side 2110. This embodiment may allow the bottom edge of the pot side 2110 to continue to provide a stable base for the potting system while allowing the tab/slot attachment system of the bottom panels to the pot side to be reversed from that shown in FIG. 1.

Figure 22:
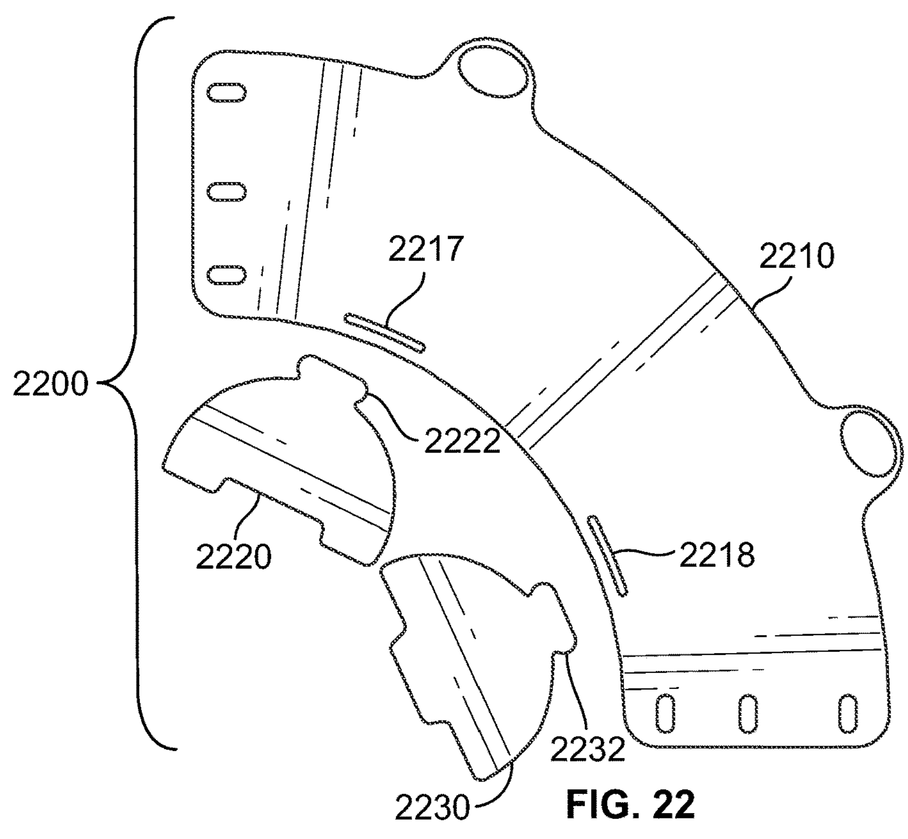
FIG. 22 illustrates an alternative one tab connection system for connecting the first bottom panel and second bottom panel to the pot side.

FIG. 22 illustrates an alternative one tab connection system 2200 for connecting the first bottom panel 2220 and second bottom panel 2230 to the pot side 2210. As shown in FIG. 22, the pot side 2210 includes a first bottom panel slot 2217 and second bottom panel slot 2218. The first bottom panel 2220 includes a large first bottom panel tab 2222. The second bottom panel 2230 includes a large second bottom panel tab 2232.

In operation, the first and second bottom panels 2220, 2230 are attached to the pot side 2210 by inserting the first bottom panel tab 2222 into the first bottom panel slot 2217 and inserting second bottom panel tab 2232 into the second bottom panel slot 2218. This embodiment may be useful when a stronger attachment of the bottom panels 2220, 2230 to the pot side 2210 is desired.

FIGS. 23-36 illustrate an alternative embodiment of the potting system with as pull lace attached to the pot side.

Figure 23:
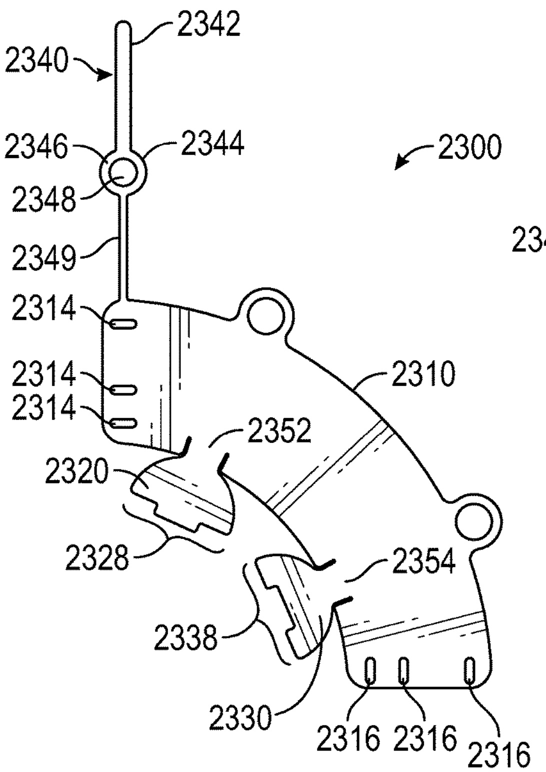
FIG. 23 illustrates a flat, unassembled view of the alternative embodiment of the potting system.

FIG. 23 illustrates a flat, unassembled view of the alternative embodiment 2300 of the potting system. FIG. 23 shows the pot side 2310, a plurality of first lacing apertures 2314, a plurality of second lacing apertures 2316, a first attached bottom panel 2320, a first attached bottom panel mesh structure 2328, a second attached bottom panel 2330, a second attached bottom panel mesh structure 2338, a lace pull 2340, a lace insert portion 2342, a lace grip head 2344, a pot side engagement surface 2346, a lace grip structure 2348, a lace attachment 2349, a first bottom panel attachment connection 2352, and a second bottom panel attachment connection 2354.

As shown in FIG. 23, the alternative embodiment shares many aspects with the embodiment of the above figures, but in FIG. 23, the pull lace 2340 is attached to the pot side 2310 with a lace attachment 2349. The lace attachment may be a unitary piece of material as shown in FIG. 23 or may be attached to the pot side 2310 after the pot side has been formed, for example by adhesion or a mechanical attachment. The lace grip head 2344, lace grip structure 2348 and pot side engagement surface 2346 may be any of the embodiments mentioned herein.

Additionally, instead of the first and second bottom panels being composed of separate components as shown in the embodiment of FIG. 1, the first attached bottom panel 2320 is joined with the pot side 2310 through the first bottom panel attachment connection 2352 and the second attached bottom panel 2330 is joined with the post side 2310 through the second bottom panel attachment connection 2354.

In operation, similar to that discussed above with regard to FIG. 1, the plurality of first lacing apertures 2314 are aligned with the plurality of second lacing apertures 2316. While the alignment takes place, the first attached bottom panel 2320 and second attached bottom panel 2330 are folded into the interior of the potting system and engage each other's bottom panel mesh structures similarly to as described above. Once the first attached bottom panel 2320 and second attached bottom panel 2330 are engaged and the plurality of first lacing apertures 2314 are aligned with the plurality of second lacing apertures 2316, the lace attachment 2349 is bent so that the lace insert portion 2342 may be introduced into the aligned plurality of first and second lacing apertures. Operation of the alternative embodiment may then generally proceed as discussed with regard to the other embodiments herein.

Figure 24:
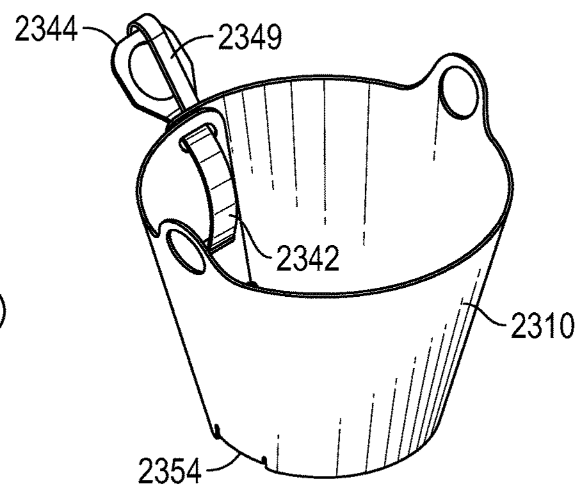
FIG. 24 illustrates a perspective view of the alternative embodiment of the potting system of FIG. 23 in its assembled configuration.

FIG. 24 illustrates a perspective view of the alternative embodiment of the potting system of FIG. 23 in its assembled configuration. FIG. 24 shows the pot side 2310, lace insert portion 2342, lace grip head 2344, lace attachment 2349, and a second bottom panel attachment connection 2354. As shown in FIG. 23, the lace attachment 2349 has been bent to allow the lace insert portion 2342 to be introduced into the aligned plurality of first and second lacing apertures. Additionally, the second bottom panel attachment connection 2354 has been bent into the interior of the potting system to allow the second attached bottom panel mesh structure 2338 to engage with the first attached bottom panel mesh structure 2328.

Figure 25:
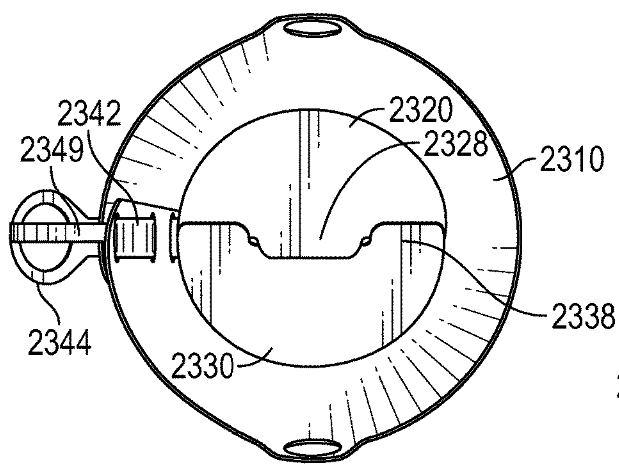
FIG. 25 illustrates a top view of the alternative embodiment of the potting system of FIG. 23 in its assembled configuration.

FIG. 25 illustrates a top view of the alternative embodiment of the potting system of FIG. 23 in its assembled configuration. FIG. 25 shows the pot side 2310, first attached bottom panel 2320, first attached bottom panel mesh structure 2328, second attached bottom panel 2330, second attached bottom panel mesh structure 2338, lace insert portion 2342, lace grip head 2344, and lace attachment 2349. As shown in FIG. 23, the first attached bottom panel mesh structure 2328 is engaged with the second attached bottom panel mesh structure 2338. As discussed above, these mesh structures may be any of the mesh structures disclosed herein.

Figure 26:
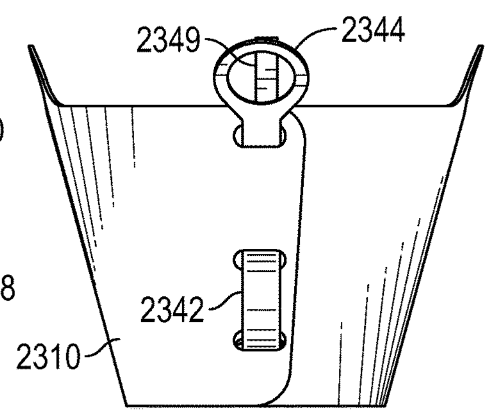
FIG. 26 illustrates a side elevational view of the alternative embodiment of the potting system of FIG. 23 in its assembled configuration.

FIG. 26 illustrates a side elevational view of the alternative embodiment of the potting system of FIG. 23 in its assembled configuration. FIG. 26 shows the pot side 2310, lace insert portion 2342, lace grip head 2344, and lace attachment 2349.

FIGS. 27-30 illustrate an alternative embodiment of the potting system that is configured as a cylinder.

Figure 27:
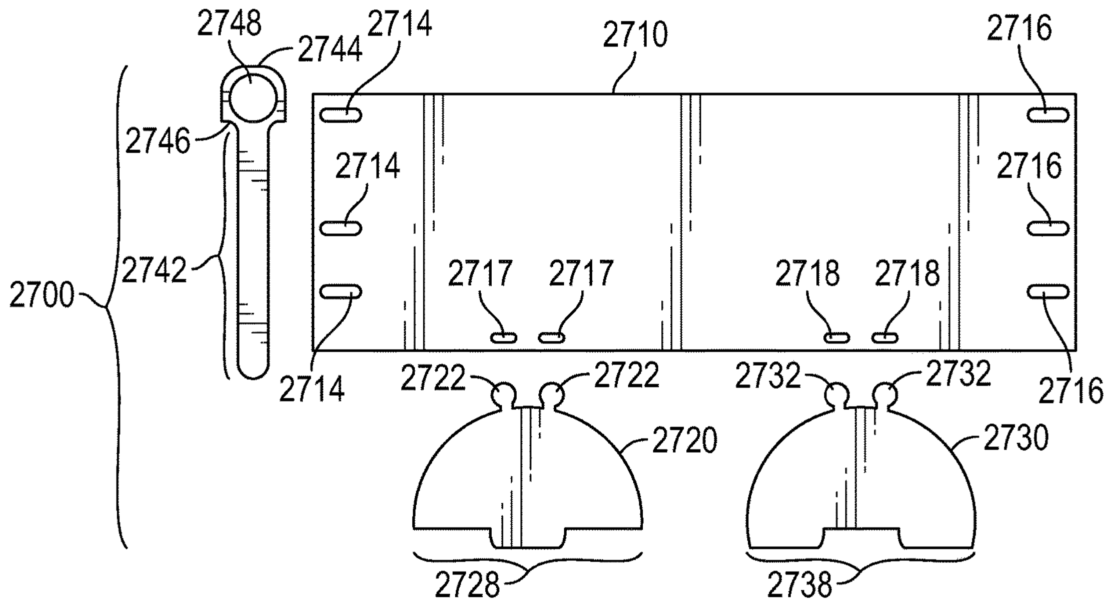
FIG. 27 illustrates a flat, unassembled view of the alternative embodiment of the potting system.

FIG. 27 illustrates a flat, unassembled view of the alternative embodiment 2700 of the potting system. FIG. 27 shows the pot side 2710, a plurality of first lacing apertures 2714, a plurality of second lacing apertures 2716, a plurality of first bottom panel apertures 2717, a plurality of second bottom panel apertures 2718, a first bottom panel 2720 including a plurality of first bottom panel tabs 2722 and a first bottom panel mesh structure 2728, a second bottom panel 2730 including a plurality of second bottom panel tabs 2732 and a second bottom panel mesh structure 2738, a lace pull 2740, a lace insert portion 2742, a lace grip head 2744, a pot side engagement surface 2746, and a lace grip structure 2748.

As shown in FIG. 27, the alternative embodiment shares many aspects with the embodiment of the above figures, but in FIG. 27, the shape of the pot side 2710 is configured to that it forms a cylinder when the plurality of first lacing apertures 2714 are aligned with the plurality of second lacing apertures 2716. The lace grip head 2744, lace grip structure 2748, pot side engagement surface 2746, first bottom panel mesh structure 2728, second bottom panel mesh structure 2738, and the connection modality connecting the bottom panels to the pot side may be any of the embodiments mentioned herein.

Figure 28:
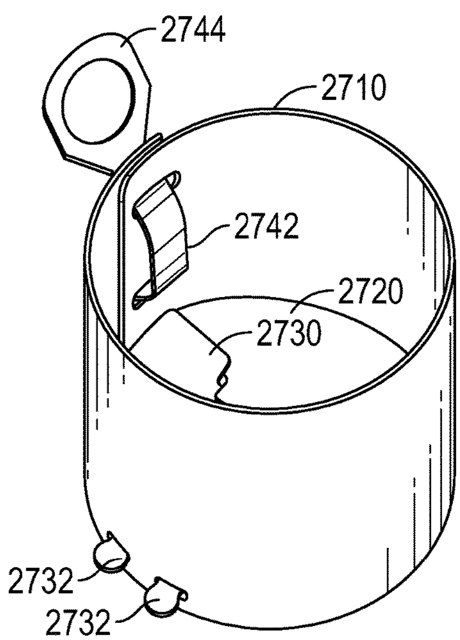
FIG. 28 illustrates a perspective view of the alternative embodiment of the potting system of FIG. 27 in its assembled configuration.

FIG. 28 illustrates a perspective view of the alternative embodiment of the potting system of FIG. 27 in its assembled configuration. FIG. 28 shows the pot side 2710, lace insert portion 2742, lace grip head 2744, first bottom panel 2720, second bottom panel 2730, and second bottom panel tabs 2732

Figure 29:
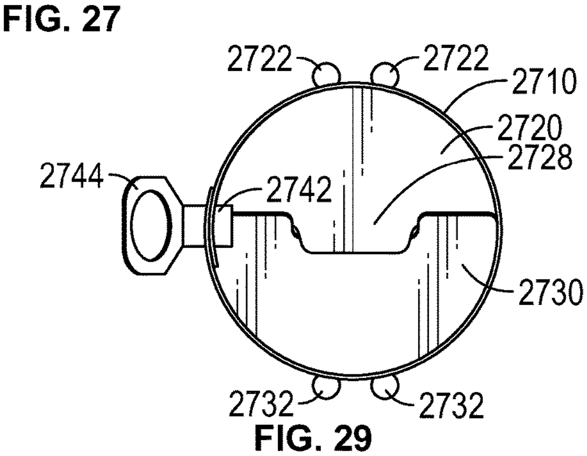
FIG. 29 illustrates a top view of the alternative embodiment of the potting system of FIG. 27 in its assembled configuration.

FIG. 29 illustrates a top view of the alternative embodiment of the potting system of FIG. 27 in its assembled configuration. FIG. 29 shows the pot side 2710, first bottom panel 2720, the plurality of first bottom panel tabs 2722, the first bottom panel mesh structure 2728, the second bottom panel 2730, the plurality of second bottom panel tabs 2732, the second bottom panel mesh structure 2738, the lace insert portion 2742, and the lace grip head 2744.

Figure 30:
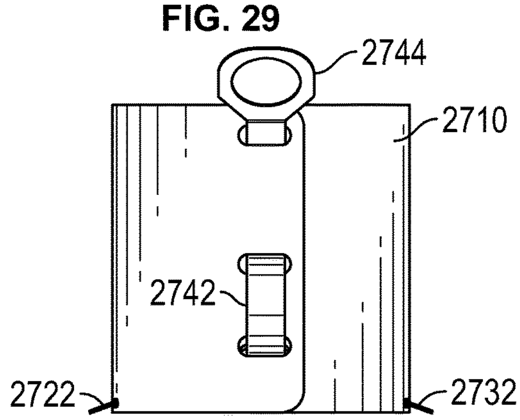
FIG. 30 illustrates a side elevational view of the alternative embodiment of the potting system of FIG. 27 in its assembled configuration.

FIG. 30 illustrates a side elevational view of the alternative embodiment of the potting system of FIG. 27 in its assembled configuration. FIG. 30 shows the pot side 2710, lace insert portion 2742, lace grip head 2744, first bottom panel tabs 2722, and second bottom panel tabs 2732.

FIGS. 31-34 illustrate an alternative embodiment of the potting system that is configured as a multi-piece frustocone.

Figure 31:
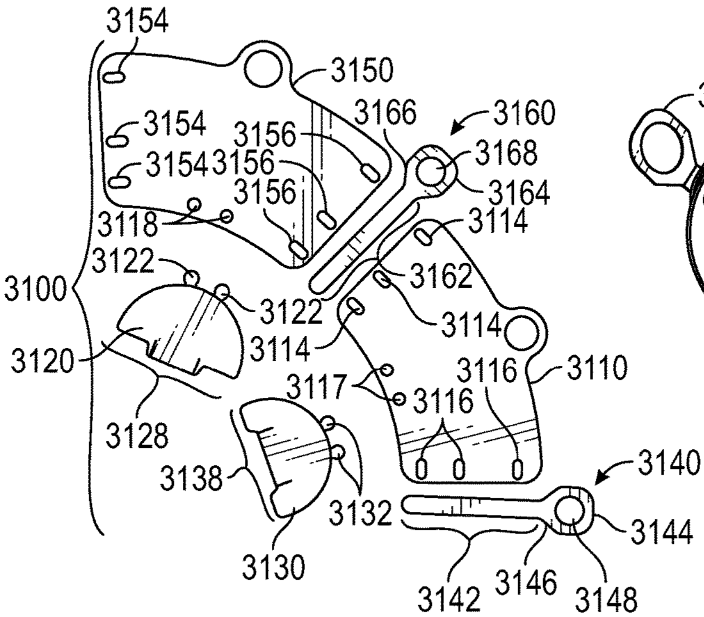
FIG. 31 illustrates a flat, unassembled view of the alternative embodiment of the potting system.

FIG. 31 illustrates a flat, unassembled view of the alternative embodiment 3100 of the potting system. FIG. 31 shows the first pot side 3110, second pot side 3150, a first pot side plurality of first lacing apertures 3114, a first pot side plurality of second lacing apertures 3116, a second pot side plurality of first lacing apertures 3154, a second pot side plurality of second lacing apertures 3156, a plurality of first bottom panel apertures 3117, a plurality of second bottom panel apertures 3118, a first bottom panel 3120 including a plurality of first bottom panel tabs 3122 and a first bottom panel mesh structure 3128, a second bottom panel 3130 including a plurality of second bottom panel tabs 3132 and a second bottom panel mesh structure 3138, a first lace pull 3140, a first lace insert portion 3142, a first lace grip head 3144, a first pot side engagement surface 3146, a first lace grip structure 3148, a second lace pull 3160, a second lace insert portion 3162, a second lace grip head 3164, a second pot side engagement surface 3166, and a second lace grip structure 3168.

As shown in FIG. 31, the alternative embodiment shares many aspects with the embodiment of the above figures, but in FIG. 31, the pot side is composed of two pieces instead of one piece and the two pieces of the pot side are joined together using two lace pulls. The first and second lace grip heads 3144, 3164, first and second lace grip structures 3148, 3168, first and second pot side engagement surface 3146, 3166, first bottom panel mesh structure 3128, second bottom panel mesh structure 3138, first and second lace pulls 3140, 3160 and their associated structures, and the connection modality connecting the bottom panels to the pot sides may be any of the embodiments mentioned herein.

In operation to assemble this alternative embodiment, the first step is to join the first pot side 3110 to the second pot side 3150 by aligning the first pot side plurality of first lacing apertures 3114 with the second pot side plurality of second lacing apertures 3156 and then passing the first lace pull 3140 through the aligned apertures. Next, the first bottom panel 3130 is attached to the first pot side 3110 by introducing the plurality of first bottom panel tabs 3122 into the plurality of first bottom panel apertures 3117. Then the second bottom panel 3130 is attached to the second pot side 3150 by introducing the plurality of second bottom panel tabs 3152 into the plurality of second bottom panel apertures 3118. Next, similar to that discussed above with regard to FIG. 1, the first pot side plurality of second lacing apertures 3116 are aligned with the second pot side plurality of first lacing apertures 3154. While the alignment takes place, the first bottom panel 3120 and second bottom panel 3130 engage each other's bottom panel mesh structures 3128, 3138 similarly to as described above. Once the first bottom panel 3120 and second bottom panel 3130 are engaged and the first pot side plurality of second lacing apertures 3116 are aligned with the second pot side plurality of first lacing apertures 3154, the second first lace pull 3160 is passed through the aligned apertures.

Figure 32:
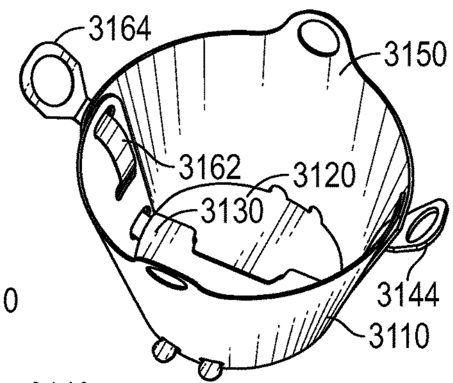
FIG. 32 illustrates a perspective view of the alternative embodiment of the potting system of FIG. 31 in its assembled configuration.

FIG. 32 illustrates a perspective view of the alternative embodiment of the potting system of FIG. 31 in its assembled configuration. FIG. 32 shows the first pot side 3110, second pot side 3150, the first bottom panel 3120, the second bottom panel 3140, the first lace grip head 3144, the second lace grip head 3164, the second lace insert portion 3162.

Figure 33:
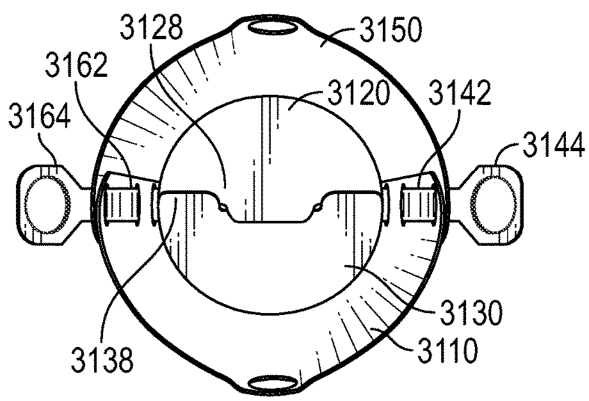
FIG. 33 illustrates a top view of the alternative embodiment of the potting system of FIG. 31 in its assembled configuration.

FIG. 33 illustrates a top view of the alternative embodiment of the potting system of FIG. 31 in its assembled configuration. FIG. 33 shows the first pot side 3110, the second pot side 3150, first bottom panel 3120, the first bottom panel mesh structure 3128, the second bottom panel 3130, the second bottom panel mesh structure 3138, the first lace insert portion 3142, the first lace grip head 3144, the second lace insert portion 3162, and the second lace grip head 3164.

Figure 34:
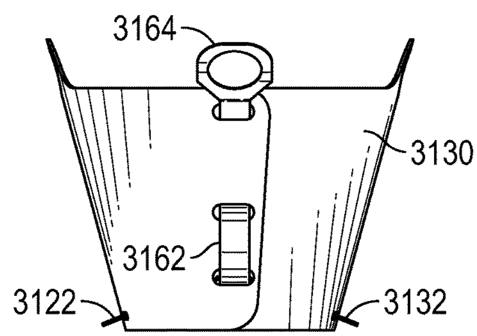
FIG. 34 illustrates a side elevational view of the alternative embodiment of the potting system of FIG. 31 in its assembled configuration.

FIG. 34 illustrates a side elevational view of the alternative embodiment of the potting system of FIG. 31 in its assembled configuration. FIG. 34 shows the first pot side 3110, the second pot side 3150, the second lace insert portion 3142, the second lace grip head 3164, first bottom panel tabs 3122, and second bottom panel tabs 3132.

FIGS. 35-38 illustrate an alternative embodiment of the potting system that is configured as a rectilinear shape.

Figure 35:
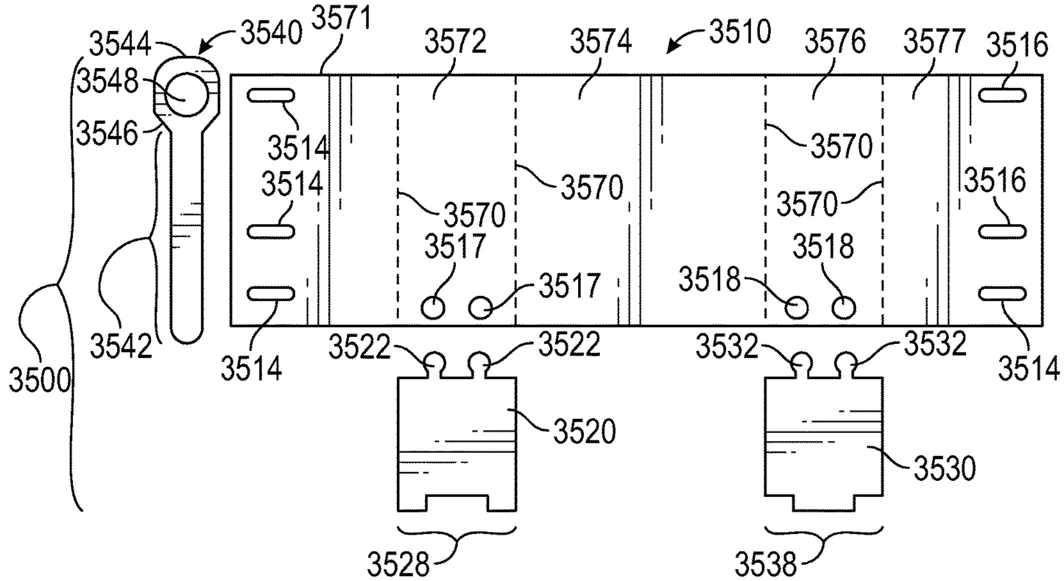
FIG. 35 illustrates a flat, unassembled view of the alternative embodiment of the potting system.

FIG. 35 illustrates a flat, unassembled view of the alternative embodiment 3500 of the potting system. FIG. 35 shows the pot side 3510, a plurality of first lacing apertures 3514, a plurality of second lacing apertures 3516, a plurality of first bottom panel apertures 3517, a plurality of second bottom panel apertures 3518, a first bottom panel 3520 including a plurality of first bottom panel tabs 3522 and a first bottom panel mesh structure 3528, a second bottom panel 3530 including a plurality of second bottom panel tabs 3532 and a second bottom panel mesh structure 3538, a lace pull 3540, a lace insert portion 3542, a lace grip head 3544, a pot side engagement surface 3546, and a lace grip structure 3548. Additionally, the pot side 3510 includes a plurality of fold lines 3570 that, when folded, cause the pot side 3510 to assume a shape including a first pot side wall 3572, a second pot side wall 3574, a third pot side wall 3576, and a fourth pot side wall composed of a first fourth pot side wall component 3571 and a second fourth pot side wall component 3577.

As shown in FIG. 35, the alternative embodiment shares many aspects with the embodiment of the above figures, but in FIG. 35, the shape of the pot side 3510 is configured to that it forms a rectilinear shape such as a square or rectangle cross-section when the plurality of first lacing apertures 3514 are aligned with the plurality of second lacing apertures 3516. The rectilinear shape arises because the pot side 3510 folds at the plurality of fold lines 3570, which may be scored, perforated, or otherwise weakened or hinged portions of the pot side 3510. The positioning of the fold lines 3570 may be altered to produce the desired rectilinear cross-section. Features of the embodiment, such as the pull lace 3540 including the lace grip head 3544, lace grip structure 3548, pot side engagement surface 3546, first bottom panel mesh structure 3528, second bottom panel mesh structure 3538, and the connection modality connecting the bottom panels to the pot side may be any of the embodiments mentioned herein.

In operation, pot side 3510 is first bent at each of the fold lines 3570 to form a rectilinear shape including the first pot side wall 3572, second pot side wall 3574, and third pot side wall 3576. The plurality of first bottom panel tabs 3522 are then engaged with the plurality of first bottom panel apertures 3517 and the plurality of second bottom panel tabs 3532 are engaged with the plurality of second bottom panel apertures 3518. The fourth pot wall is then formed by aligning the plurality of first lacing apertures 3514 and plurality of second lacing apertures 3516 which causes the first fourth pot side wall component 3571 and second fourth pot side wall component 3577 to overlap one another substantially in parallel to form the fourth pot side wall. The pull lace 3540 is then passes through the aligned plurality of first and second lacing apertures 3514, 3516.

Figure 36:
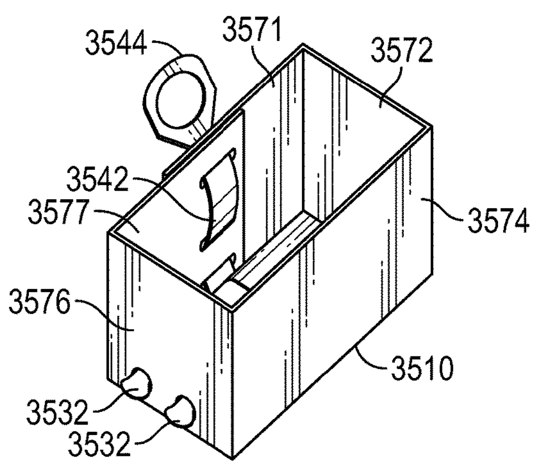
FIG. 36 illustrates a perspective view of the alternative embodiment of the potting system of FIG. 35 in its assembled configuration.

FIG. 36 illustrates a perspective view of the alternative embodiment of the potting system of FIG. 35 in its assembled configuration. FIG. 36 shows the pot side 3510, lace insert portion 3542, lace grip head 3544, second bottom panel tabs 3532, the first pot side wall 3572, the second pot side wall 3574, the third pot side wall 3576, the first fourth pot side wall component 3571 and the second fourth pot side wall component 3577.

Figure 37:
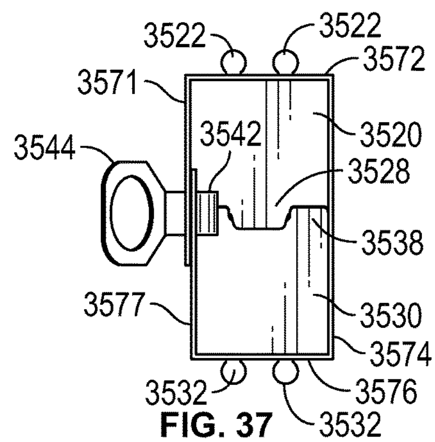
FIG. 37 illustrates a top view of the alternative embodiment of the potting system of FIG. 35 in its assembled configuration.

FIG. 37 illustrates a top view of the alternative embodiment of the potting system of FIG. 35 in its assembled configuration. FIG. 37 shows the pot side 3510, first bottom panel 3520, the plurality of first bottom panel tabs 3522, the first bottom panel mesh structure 3528, the second bottom panel 3530, the plurality of second bottom panel tabs 3532, the second bottom panel mesh structure 3538, the lace insert portion 3542, the lace grip head 3544, the first pot side wall 3572, the second pot side wall 3574, the third pot side wall 3576, the first fourth pot side wall component 3571 and the second fourth pot side wall component 3577.

Figure 38:
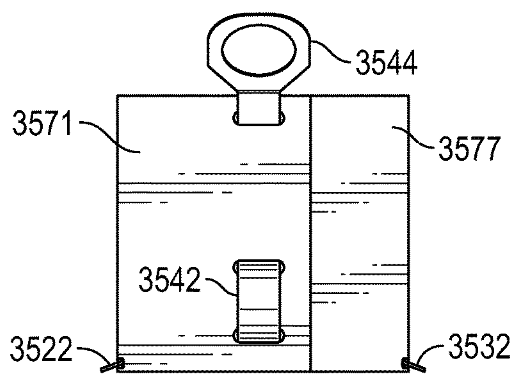
FIG. 38 illustrates a side elevational view of the alternative embodiment of the potting system of FIG. 35 in its assembled configuration.

FIG. 38 illustrates a side elevational view of the alternative embodiment of the potting system of FIG. 35 in its assembled configuration. FIG. 38 shows the first fourth pot side wall component 3571, the second fourth pot side wall component 3577, the lace insert portion 2742, lace grip head 2744, first bottom panel tabs 2722, and second bottom panel tabs 3532.

FIGS. 39-42 illustrate an alternative embodiment of the potting system that is configured as a rectilinear, two-piece embodiment.

Figure 39:
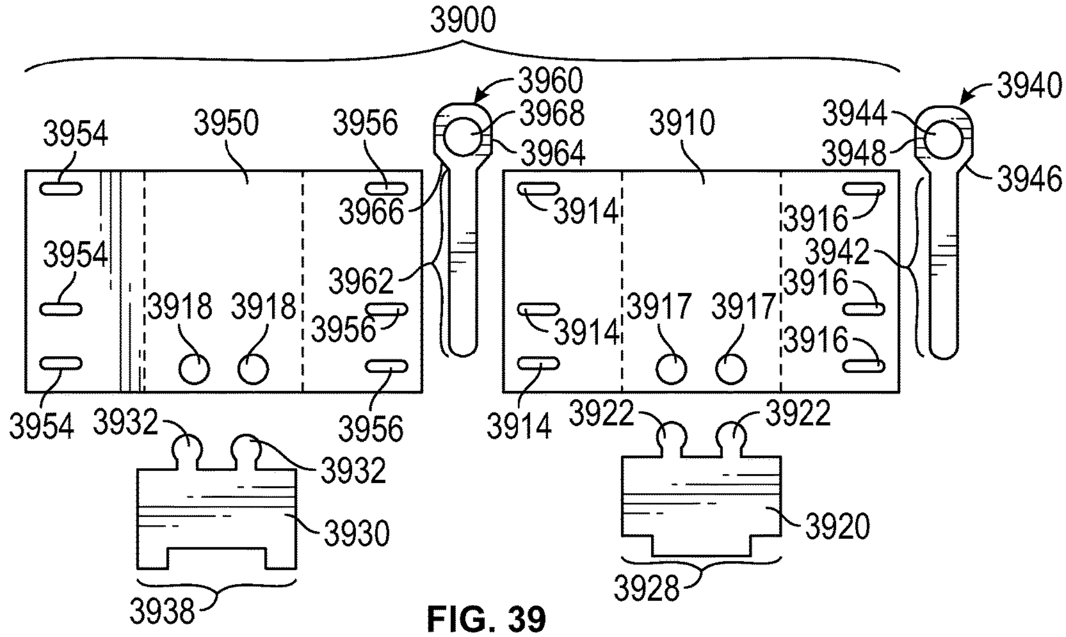
FIG. 39 illustrates a flat, unassembled view of the alternative embodiment of the potting system.

FIG. 39 illustrates a flat, unassembled view of the alternative embodiment 3900 of the potting system. FIG. 39 shows the first pot side 3910, second pot side 3950, a first pot side plurality of first lacing apertures 3914, a first pot side plurality of second lacing apertures 3916, a second pot side plurality of first lacing apertures 3954, a second pot side plurality of second lacing apertures 3956, a plurality of first bottom panel apertures 3917, a plurality of second bottom panel apertures 3918, a first bottom panel 3920 including a plurality of first bottom panel tabs 3922 and a first bottom panel mesh structure 3928, a second bottom panel 3930 including a plurality of second bottom panel tabs 3932 and a second bottom panel mesh structure 3938, a first lace pull 3940, a first lace insert portion 3942, a first lace grip head 3944, a first pot side engagement surface 3946, a first lace grip structure 3948, a second lace pull 3960, a second lace insert portion 3962, a second lace grip head 3964, a second pot side engagement surface 3966, and a second lace grip structure 3968.

As shown in FIG. 39, the alternative embodiment shares many aspects with the embodiment of the above figures and especially FIGS. 35-38, but in FIG. 39, the pot side is composed of two pieces that form a rectilinear potting system instead of one piece and the two pieces of the pot side are joined together using two lace pulls. The features of the embodiment including the features of the first and second lace pulls 3940, 3960 including the first and second lace grip heads 3944, 3964, first and second lace grip structures 3948, 3968, first and second pot side engagement surface 3946, 3966, first bottom panel mesh structure 3928, second bottom panel mesh structure 3938, first and second lace pulls 3940, 3960 and their associated structures, and the connection modality connecting the bottom panels to the pot sides may be any of the embodiments mentioned herein.

In operation to assemble this alternative embodiment, the first step is to join the first pot side 3910 to the second pot side 3950 by aligning the first pot side plurality of first lacing apertures 3914 with the second pot side plurality of second lacing apertures 3956 and then passing the first lace pull 3940 through the aligned apertures. Next, the first bottom panel 3930 is attached to the first pot side 3910 by introducing the plurality of first bottom panel tabs 3922 into the plurality of first bottom panel apertures 3917. Then the second bottom panel 3930 is attached to the second pot side 3950 by introducing the plurality of second bottom panel tabs 3952 into the plurality of second bottom panel apertures 3918. Next, similar to that discussed above with regard to FIG. 1, the first pot side plurality of second lacing apertures 3916 are aligned with the second pot side plurality of first lacing apertures 3954. While the alignment takes place, the first bottom panel 3920 and second bottom panel 3930 engage each other's bottom panel mesh structures 3928, 3938 similarly to as described above. Once the first bottom panel 3920 and second bottom panel 3930 are engaged and the first pot side plurality of second lacing apertures 3916 are aligned with the second pot side plurality of first lacing apertures 3954, the second first lace pull 3960 is passed through the aligned apertures.

Figure 40:
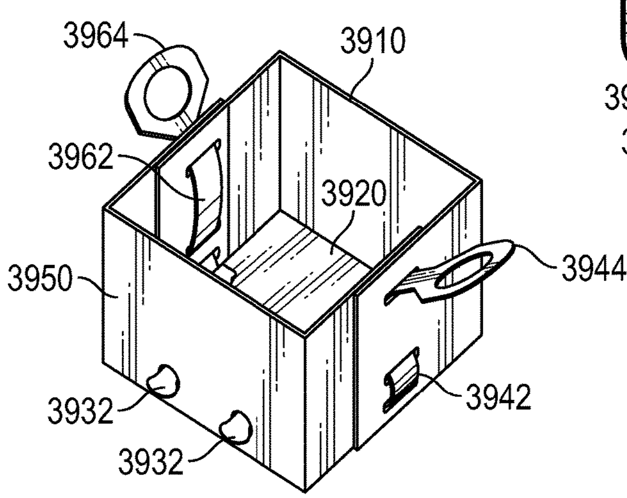
FIG. 40 illustrates a perspective view of the alternative embodiment of the potting system of FIG. 39 in its assembled configuration.

FIG. 40 illustrates a perspective view of the alternative embodiment of the potting system of FIG. 39 in its assembled configuration. FIG. 40 shows the first pot side 3910, second pot side 3950, the first bottom panel 3920, the plurality of second bottom panel tabs 3922, the first lace grip head 3944, the first lace insert portion 3942, the second lace grip head 3964, and the second lace insert portion 3962.

Figure 41:
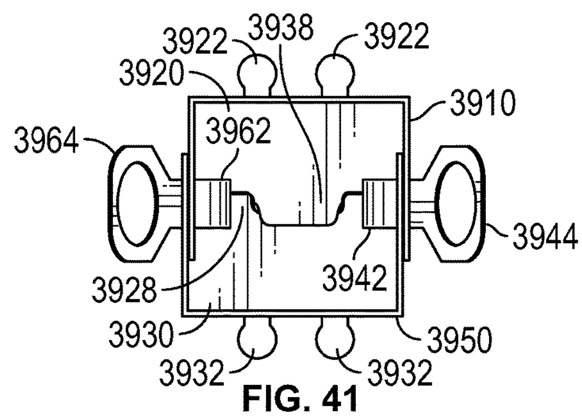
FIG. 41 illustrates a top view of the alternative embodiment of the potting system of FIG. 39 in its assembled configuration.

FIG. 41 illustrates a top view of the alternative embodiment of the potting system of FIG. 39 in its assembled configuration. FIG. 41 shows the first pot side 3910, the second pot side 3950, first bottom panel 3920, the plurality of first bottom panel tabs 3922, the first bottom panel mesh structure 3928, the second bottom panel 3930, the plurality of first bottom panel tabs 3932, the second bottom panel mesh structure 3938, the first lace grip head 3944, the second lace grip head 3964, the first lace insert portion 3942, and the second lace insert portion 3962.

Figure 42:
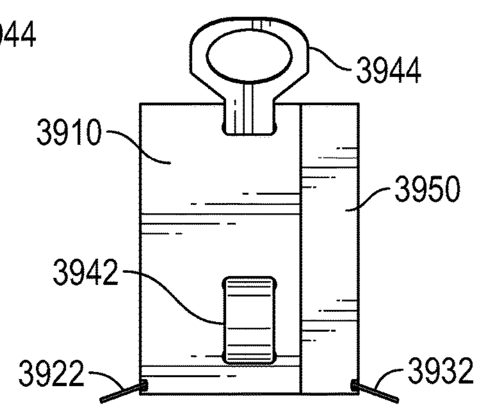
FIG. 42 illustrates a side elevational view of the alternative embodiment of the potting system of FIG. 39 in its assembled configuration.

FIG. 42 illustrates a side elevational view of the alternative embodiment of the potting system of FIG. 39 in its assembled configuration. FIG. 42 shows the first pot side 3910, the second pot side 3950, the first lace insert portion 3942, the first lace grip head 3964, first bottom panel tabs 3922, and second bottom panel tabs 3932.

FIGS. 43-46 illustrate an alternative embodiment of the potting system that is configured as a wide-bottom frustocone.

Figure 43:
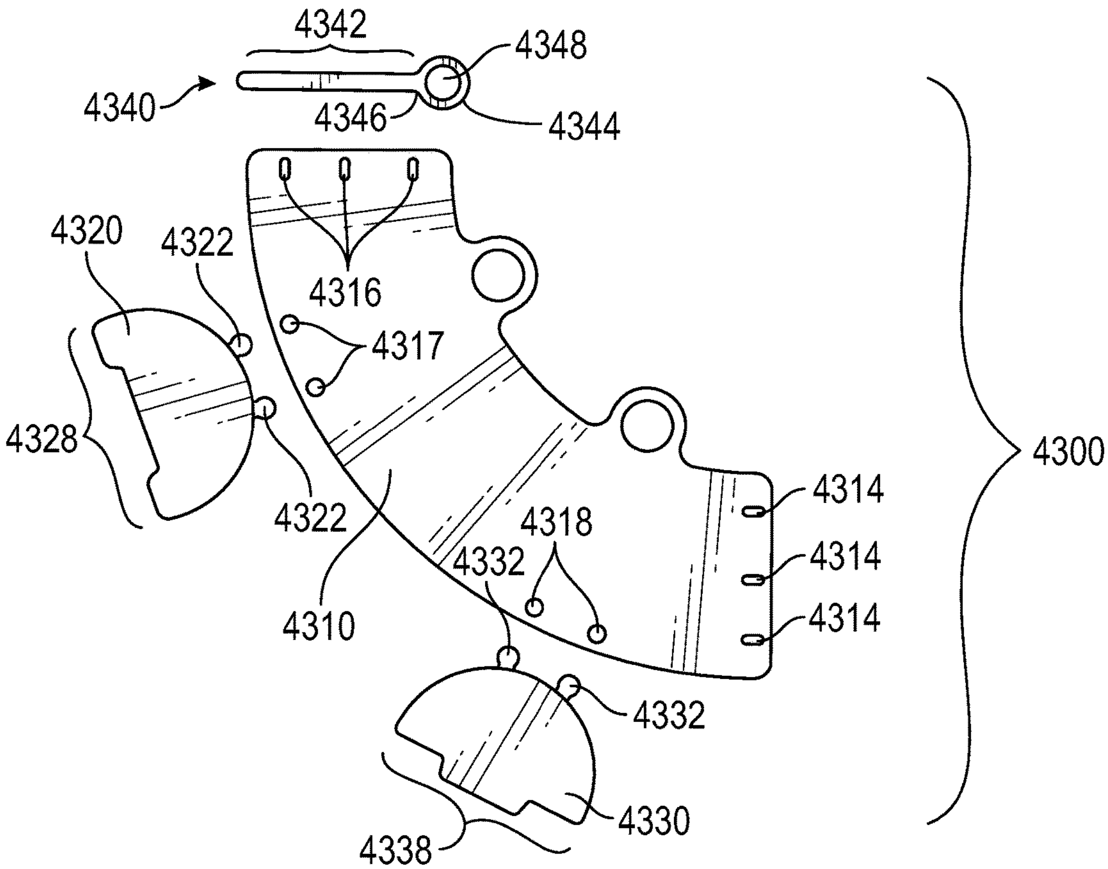
FIG. 43 illustrates a flat, unassembled view of the alternative embodiment of the potting system.

FIG. 43 illustrates a flat, unassembled view of the alternative embodiment 4300 of the potting system. FIG. 43 shows the pot side 4310, a plurality of first lacing apertures 4314, a plurality of second lacing apertures 4316, a plurality of first bottom panel apertures 4317, a plurality of second bottom panel apertures 4318, a first bottom panel 4320 including a plurality of first bottom panel tabs 4322 and a first bottom panel mesh structure 4328, a second bottom panel 4330 including a plurality of second bottom panel tabs 4332 and a second bottom panel mesh structure 4338, a lace pull 4340, a lace insert portion 4342, a lace grip head 4344, a pot side engagement surface 4346, and a lace grip structure 4348.

As shown in FIG. 43, the alternative embodiment shares many aspects with the embodiment of the above figures, but in FIG. 43, the shape of the pot side 4310 is configured to that it forms a frustoconical shape with the wide part of the frustocone at the bottom when the plurality of first lacing apertures 4314 are aligned with the plurality of second lacing apertures 4316. The features of the embodiment including the pull lace 4340, lace grip head 4344, lace grip structure 4348, pot side engagement surface 4346, first bottom panel mesh structure 4328, second bottom panel mesh structure 4338, and the connection modality connecting the bottom panels to the pot side may be any of the embodiments mentioned herein.

Figure 44:
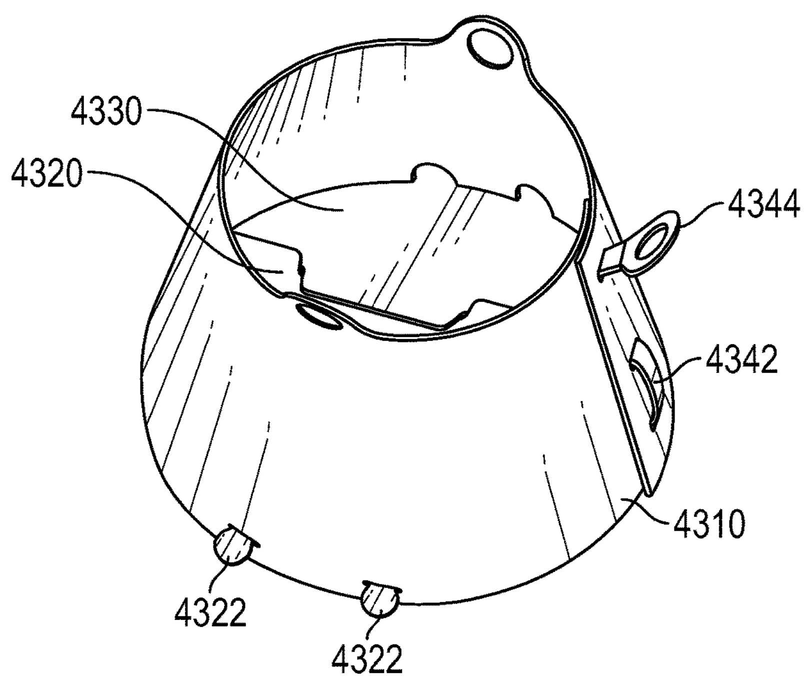
FIG. 44 illustrates a perspective view of the alternative embodiment of the potting system of FIG. 43 in its assembled configuration.

FIG. 44 illustrates a perspective view of the alternative embodiment of the potting system of FIG. 43 in its assembled configuration. FIG. 44 shows the pot side 4310, lace insert portion 4342, lace grip head 4344, first bottom panel 4320, second bottom panel 4330, and second bottom panel tabs 4332

Figure 45:
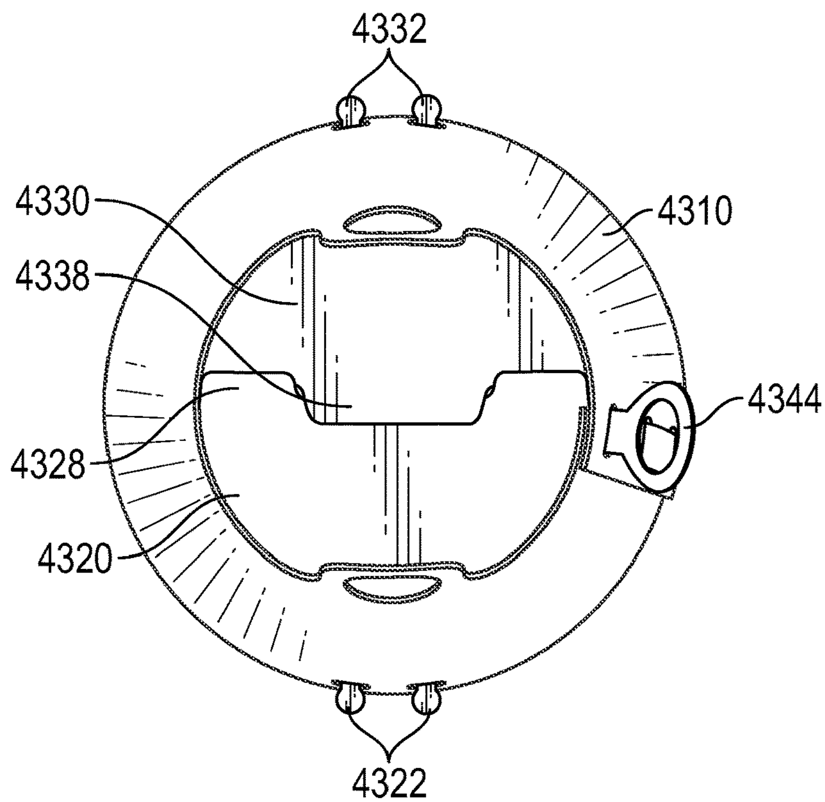
FIG. 45 illustrates a top view of the alternative embodiment of the potting system of FIG. 43 in its assembled configuration.

FIG. 45 illustrates a top view of the alternative embodiment of the potting system of FIG. 43 in its assembled configuration. FIG. 45 shows the pot side 4310, first bottom panel 4320, the plurality of first bottom panel tabs 4322, the first bottom panel mesh structure 4328, the second bottom panel 4330, the plurality of second bottom panel tabs 4332, the second bottom panel mesh structure 4338, and the lace grip head 4344.

Figure 46:
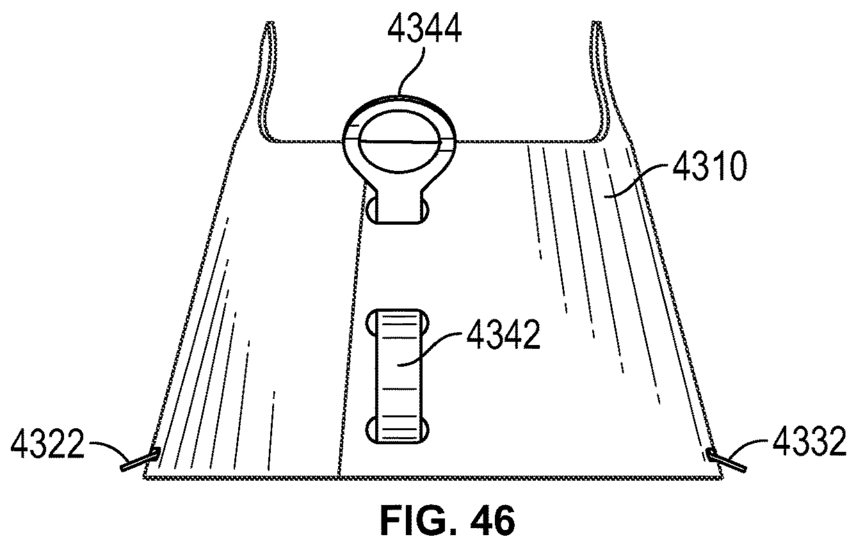
FIG. 46 illustrates a side elevational view of the alternative embodiment of the potting system of FIG. 43 in its assembled configuration.

FIG. 46 illustrates a side elevational view of the alternative embodiment of the potting system of FIG. 43 in its assembled configuration. FIG. 46 shows the pot side 4310, lace insert portion 4342, lace grip head 4344, first bottom panel tabs 4322, and second bottom panel tabs 4332.

FIGS. 47-50 illustrate an alternative embodiment of the potting system that is configured as a multi-piece wide-bottom frustocone. This embodiment may be preferable in applications where a more stable based is desired, such as applications where wind may be a factor.

Figure 47:
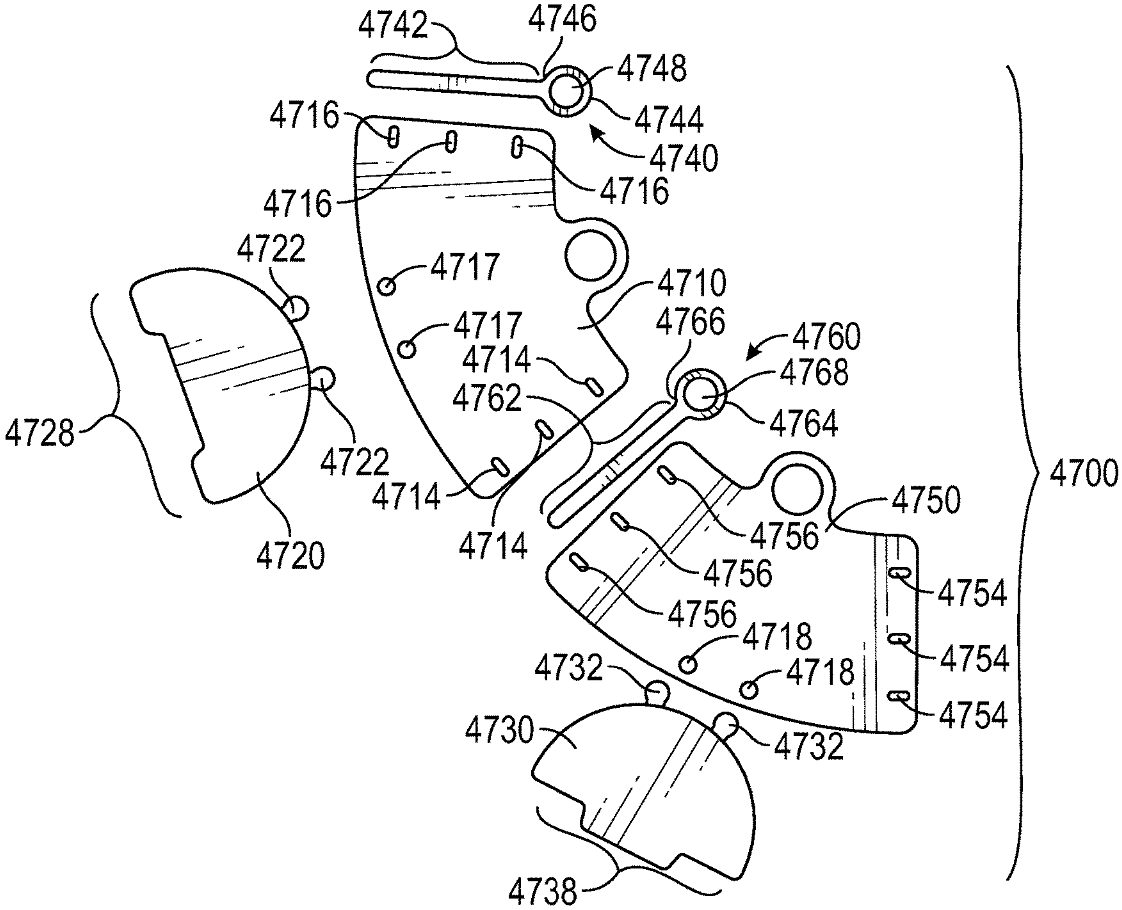
FIG. 47 illustrates a flat, unassembled view of the alternative embodiment of the potting system.

FIG. 47 illustrates a flat, unassembled view of the alternative embodiment 4700 of the potting system. FIG. 47 shows the first pot side 4710, second pot side 4750, a first pot side plurality of first lacing apertures 4714, a first pot side plurality of second lacing apertures 4716, a second pot side plurality of first lacing apertures 4754, a second pot side plurality of second lacing apertures 4756, a plurality of first bottom panel apertures 4717, a plurality of second bottom panel apertures 4718, a first bottom panel 4720 including a plurality of first bottom panel tabs 4722 and a first bottom panel mesh structure 4728, a second bottom panel 4730 including a plurality of second bottom panel tabs 4732 and a second bottom panel mesh structure 4738, a first lace pull 4740, a first lace insert portion 4742, a first lace grip head 4744, a first pot side engagement surface 4746, a first lace grip structure 4748, a second lace pull 4760, a second lace insert portion 4762, a second lace grip head 4764, a second pot side engagement surface 4766, and a second lace grip structure 4768.

As shown in FIG. 47, the alternative embodiment shares many aspects with the embodiment of the above figures and especially FIGS. 43-46, but in FIG. 47, the pot side is composed of two pieces that form a wide-bottom frustocone instead of one piece and the two pieces of the pot side are joined together using two lace pulls. The features of the embodiment including the features of the first and second lace pulls 4740, 4760 including the first and second lace grip heads 4744, 4764, first and second lace grip structures 4748, 4768, first and second pot side engagement surface 4746, 4766, first bottom panel mesh structure 4728, second bottom panel mesh structure 4738, first and second lace pulls 4740, 4760 and their associated structures, and the connection modality connecting the bottom panels to the pot sides may be any of the embodiments mentioned herein.

In operation to assemble this alternative embodiment, the first step is to join the first pot side 4710 to the second pot side 4750 by aligning the first pot side plurality of first lacing apertures 4714 with the second pot side plurality of second lacing apertures 4756 and then passing the first lace pull 4740 through the aligned apertures. Next, the first bottom panel 4730 is attached to the first pot side 4710 by introducing the plurality of first bottom panel tabs 4722 into the plurality of first bottom panel apertures 4717. Then the second bottom panel 4730 is attached to the second pot side 4750 by introducing the plurality of second bottom panel tabs 4752 into the plurality of second bottom panel apertures 4718. Next, similar to that discussed above with regard to FIG. 1, the first pot side plurality of second lacing apertures 4716 are aligned with the second pot side plurality of first lacing apertures 4754. While the alignment takes place, the first bottom panel 4720 and second bottom panel 4730 engage each other's bottom panel mesh structures 4728, 4738 similarly to as described above. Once the first bottom panel 4720 and second bottom panel 4730 are engaged and the first pot side plurality of second lacing apertures 4716 are aligned with the second pot side plurality of first lacing apertures 4754, the second first lace pull 4760 is passed through the aligned apertures.

Figure 48:
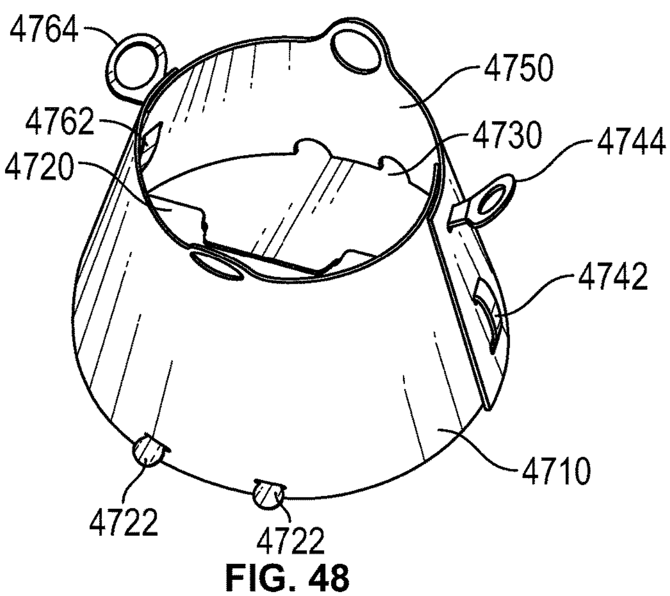
FIG. 48 illustrates a perspective view of the alternative embodiment of the potting system of FIG. 47 in its assembled configuration.

FIG. 48 illustrates a perspective view of the alternative embodiment of the potting system of FIG. 47 in its assembled configuration. FIG. 48 shows the first pot side 4710, second pot side 4750, the first bottom panel 4720, the plurality of first bottom panel tabs 4722, the second bottom panel 4740, the first lace grip head 4744, the first lace insert portion 4742, the second lace grip head 4764, and the second lace insert portion 4762.

Figure 49:
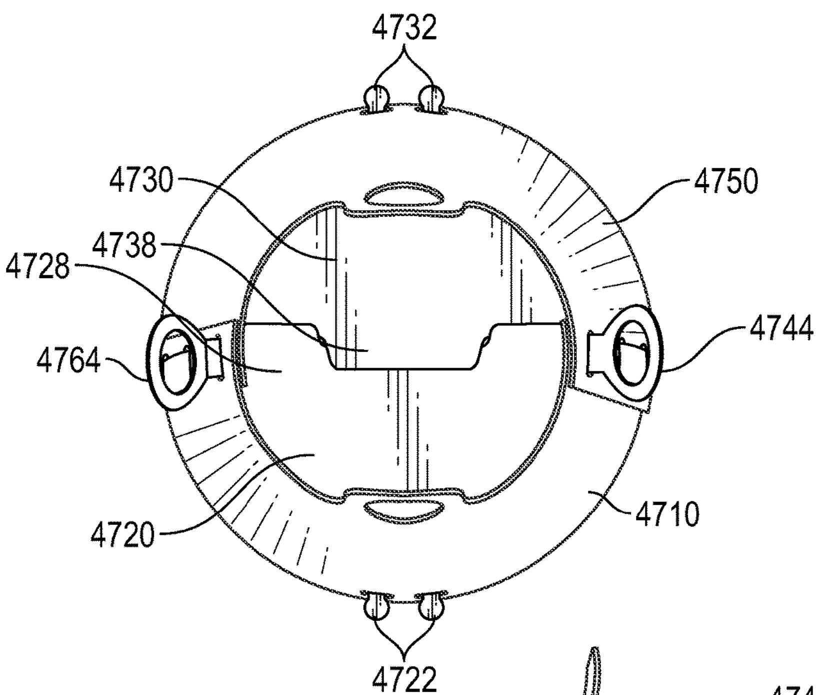
FIG. 49 illustrates a top view of the alternative embodiment of the potting system of FIG. 47 in its assembled configuration.

FIG. 49 illustrates a top view of the alternative embodiment of the potting system of FIG. 47 in its assembled configuration. FIG. 49 shows the first pot side 4710, the second pot side 4750, first bottom panel 4720, the plurality of first bottom panel tabs 4722, the first bottom panel mesh structure 4728, the second bottom panel 4730, the plurality of first bottom panel tabs 4732, the second bottom panel mesh structure 4738, the first lace grip head 4744, and the second lace grip head 4764.

Figure 50:
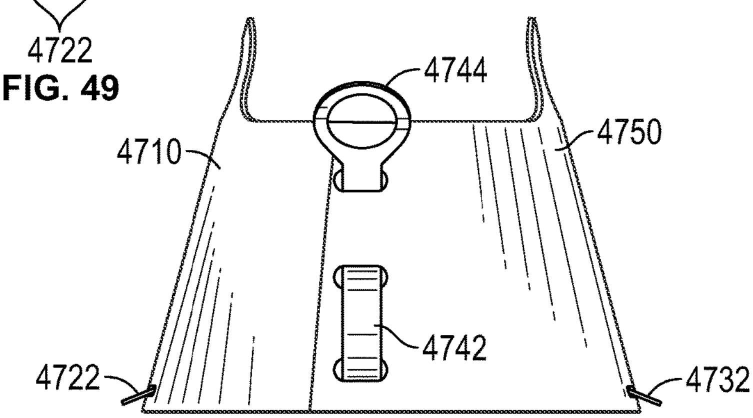
FIG. 50 illustrates a side elevational view of the alternative embodiment of the potting system of FIG. 47 in its assembled configuration.

FIG. 50 illustrates a side elevational view of the alternative embodiment of the potting system of FIG. 47 in its assembled configuration. FIG. 50 shows the first pot side 4710, the second pot side 4750, the first lace insert portion 4742, the first lace grip head 4764, first bottom panel tabs 4722, and second bottom panel tabs 4732.

Figure 51:
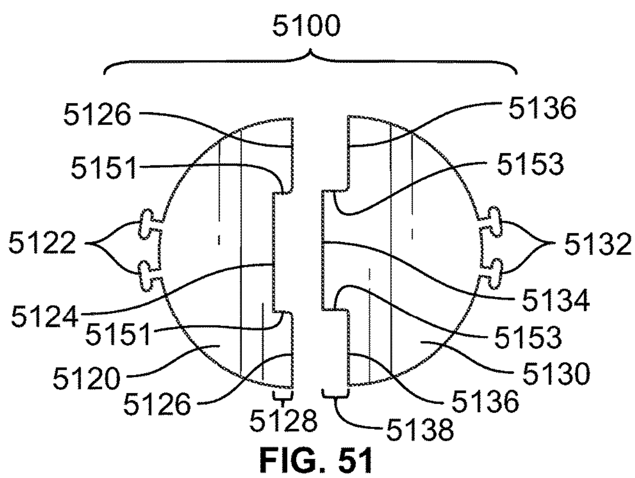
FIG. 51 illustrates an alternative embodiment of the first bottom panel and second bottom panel of FIG. 1.

FIG. 51 illustrates an alternative embodiment 5100 of the first bottom panel and second bottom panel of FIG. 1. As shown in FIG. 51, the embodiment 5100 of a first bottom panel 5120, which includes a plurality of first bottom panel tabs 5122, a first bottom panel mesh structure 5128 including a first bottom panel inset portion 5124, and a plurality of first bottom panel extended portions 5126, and a second bottom panel 5130 including a plurality of second bottom panel tabs 5132 and a second bottom panel mesh structure 5138 including the second bottom panel extended portion 5134 and plurality of second bottom panel inset portions 5136, the inner surfaces 5151 of the first bottom panel extended portions, and the outer surfaces 5153 of the second bottom panel extended portion.

As described above, the first bottom panel mesh structure 5128 and the second bottom panel mesh structure 5138 mesh together with the second bottom panel extended 5134 portion passing over the first bottom panel inset portion 5124 and the first bottom panel extended portions 5126 passing over the second bottom panel inset portions 5136.

In an alternative embodiment, although the potting systems above employ two bottom panels, an alternative potting system may include a greater number of bottom panels such as three, four, or more, wherein one or more of the panels engages one or more of the other panels to form the base of the potting system. Additionally, another alternative embodiment may include a single bottom panel that is suspended from one bottom edge of the side wall and mechanically engages the opposite bottom edge.

In an alternative embodiment, material of the pot side may be a fabric such as canvas. Additionally, the material of the pot side may be a dark color or material such as black on one side and a reflective color and/or material such as metal or silver on another side. Such an embodiment may be useful for keeping the interior of the potting system cooler, if arranged so that the reflective color and/or material is on the outside of the potting system, thus tending to reflect rather than absorb sunlight. Alternatively, such an embodiment may be useful for keeping the interior of the potting system warmer, if arranged so that the dark color and/or material is on the outside of the potting system, thus tending to absorb rather than reflect sunlight. Thus, in one embodiment, the potting system may be reversible to accommodate the needs of the user or the plant material to be positioned in the potting system. In one embodiment, a silver exterior material may reflect 99.3% of incident sunlight so that the potting system stays much cooler than a colored pot.

In an alternative embodiment, the thickness of one or more of the pull lace, bottom panels, pot sides may be increased or decreased and/or may be increased or decreased relative to one another. For example, for a larger potting system, the thicknesses of one or more of the pull lace, bottom panels, pot sides may be increased. Additionally, in one embodiment, the thickness of the bottom panels may be greater than one or more of the pull lace or pot sides, or vice versa.

In an alternative embodiment, the vertical and/or horizontal dimensions of the lacing apertures may be increased or decreased. For example, the vertical dimension of one or more of the lacing apertures may be increased when the thickness and/or bendability of the pull lace is decreased, and vice versa. Additionally, the vertical dimension of one or more of the lacing apertures may be decreased when the distance between lacing apertures is increased, such as with a larger version of the potting system. Additionally, the horizontal dimension of the one or more of the lacing apertures may be increased when it is desired to provide an easier releasing pull lace. Conversely, the horizontal dimension of one or more of the lacing apertures may be decreased when a tighter, more solid fit of the potting system is desired.

Although the embodiments above show three lacing apertures per edge of the pot side, a greater or lesser number of lacing apertures may be employed. For example, two, four or five apertures may be employed. Also, the lacing order shown in the figures where the pull lace enters the topmost lacing aperture from outside the potting system may be reversed so that the pull lace enters the topmost lacing aperture from inside the potting system.

In one embodiment, the width of the pull lace is 0.5 inches and its thickness is 0.025 inches. However, in other embodiments of the pull lace, the width varies from 0.1 inches to 2 inches and the thickness varies from 0.001 inches to 0.25 inches. In one embodiment, the width of the lacing apertures are 0.625 inches and the height of the lacing apertures are 0.25 inches. However, in other embodiments the width varies from 0.25 inches to 2 inches and the height varies from 0.1 inches to 1 inch.

In one embodiment, the height of the pot side is 4 inches.

In alternative embodiments, the angle formed by the frustoconical pot sides may be greater or lesser than shown in the Figures. For example, the angle may vary from vertical in the case of the cylindrical embodiment to approximately 30 degrees.

Additionally, as discussed above, one or more of the bottom panels, pot sides, and/or pull lace may be made of plastic or metal, such as copper, which may have mold-inhibiting properties. Additionally, one or more of the bottom panels, pot sides, and/or pull lace may be coated with mylar film having a reflective coating.

In one embodiment, the apertures for receiving the tabs connecting the bottom panels to the pot side may vary in shape and may be circular, ovoid, and/or slits. Preferably, the combination of the apertures and tabs allows the tab to be inserted into the aperture and lock in place so as to not be easily separated while still allowing for upwards and downwards motion of the bottom panels relative to the pot side. In one embodiment, the bottom panels may be joined to the side pot using one or more hinges.

In one embodiment, the apertures for receiving the tabs connecting the bottom panels to the pot side may be positioned anywhere along the bottom edge of the pot side. For example, several embodiments herein show the first and second bottom panel apertures positioned in the pot side so that, when assembled, the axis of intersection between the mesh interfaces of the first and second bottom panels also intersects the overlapped plurality of lacing apertures. However, the first and second bottom panel apertures may instead be positioned so that when assembled, the axis of intersection between the mesh interfaces of the first and second bottom panels is rotated away from or is at an offset angle to the location or axial angle of the overlapped plurality of lacing apertures. In this fashion, in a single pot side embodiment, the locations of the first and second bottom panel apertures may be located anywhere within an arc of about +/−90 degrees from the location shown herein and in a double pot side embodiment, the locations of the first and second bottom panel apertures may be located anywhere within an arc of about +/−45 degrees from the location shown herein Alternatively, in embodiments where the bottom panels are directly connected to the pot side such as in FIG. 23, the connection material may be all one piece as shown, or be two separate hinges, have a thin thickness, and/or have additional slots, holes, or radii that may impact the flexibility and strength of the connection. Preferably, the connection is constructed to form a solid bottom when desired and to allow the bottom to release when desired.

In one embodiment, the water holes in one or more of the pot side, bottom panels and/or pull lace, as shown in FIG. 19, may be of varying size and may be of a variety of shapes including circular, ovoid, square, and diamond shapes.

In one embodiment, the first and second bottom panel mesh structures may be a symmetric shape other than that shown in the figures such as a succession of rectangular and/or triangular interlocking teeth. Also, the interlocking teeth may vary in number from the 1-2 shown in the figures to a plurality of teeth on each panel such as three by three or four by four.

In one or more embodiments, the frustoconical potting system may hold a volume from about of 3×3×3 inches (half cup) to about 12×12×12 in. (2 gal.). Additionally, the bottom diameter range of the cone may be from about 1 inch to about 4 feet with a preferred range of 5-18 inches. The top diameter of the cone may be from about 1 inch to about 4 feet with preferred range of 2-18 inches. The angle of the side of the cone may be from about 15 degrees to 90 degrees (vertical) with a preferred range of 45-70 degrees. The height of the cone may be from about 1 inch to about 4 feet with a preferred angle of 3-18 inches.

In one or more embodiments of the wide-bottom cone potting system, the bottom diameter range of the cone may be from about 1 inch to about 4 feet with a preferred range of 3-8 inches. The top diameter of the cone may be from about 1 inch to about 4 feet with preferred range of 5-18 inches. The angle of the side of the cone may be from about 15 degrees to 90 degrees (vertical) with a preferred range of 45-70 degrees. The height of the cone may be from about 1 inch to about 4 feet with a preferred angle of 3-18 inches.

In one or more embodiments of the cylindrical potting system, the diameter may range from about 1 inch to about 4 feet with a preferred range of 3-18 inches. The height may range from about 1 inch to about 4 feet with a preferred range of 3-18 inches.

In one or more embodiments of the rectilinear potting system, the sides range from about 1 inch to about 4 feet with a preferred range of 3-24 inches. The height may range from about 1 inch to about 4 feet with a preferred range of 3-18 inches.

In one or more embodiments, the frustconical and/or wide bottom frustoconical potting systems may have an ovoid cross section rather than a circular cross section.

In one embodiment, the potting system provides a reusable plant container that easily and completely releases the root ball intact of all plants intended for transplanting or repotting. The potting system may be put directly in a hole, then the root ball may be released.

Additionally, there are common problems among prior art reusable containers. For example, transplanting the plant can damage the root ball. Most solutions require the gardener go slow, to squeeze, or impact the container to break the bond between the container and the root ball. Then usually turn the container upside down and shake the plant loose or pull it out by the stem. The result may be some shock or damage to the root ball. Some containers are multiple piece pots that come apart or fabric that drops down to extract the plant. Both require the gardener to pick up the plant by the stem or root ball by hand and place it in the hole or pot. This may still damage the root ball. Once in the hole if the plant is repositioned, the root ball may be damaged again. These containers also typically don't work well if the plant root ball is wet, so watering must be scheduled accordingly. Performing these common procedures also wastes valuable time.

Conversely, in one or more embodiments of the potting system, the gardener can "unwrap" the plant releasing completely the sides and bottom of the container and leaving the root ball undamaged, regardless of whether the root ball is dry or has just been totally soaked. The potting system may be put directly in the hole and it can be repositioned or oriented exactly where desired. The soil may even be filled back in the hole to help hold the plant in position. Once in position pulling the pull lace out takes only a moment and opens the sides and bottom of the potting system to unwrap and release the root ball unharmed. Simply the potting system may be relaced and it is ready to use again. When constructed from a clear material the plant's roots are visible so the gardener will know when the roots start to grow around inside the container, thus allowing plenty of time to transplant before the plant becomes root bound or girdled.

Additionally, in a transparent embodiment, the potting system stays much cooler than other nursery pots. Further, any dry spots in the soil or mix are easily to see and fix. Due to the thin wall structure of the potting system if additional drainage is desired, drainage holes can be easily cut using a common paper hole punch or other hand tool.

In one embodiment, the potting system is a one piece reusable easy root release plant container. The potting system may be used by being rolled up and laced. Then the bottoms folded in and interlocked. Pulling the lace opens the potting system and releases the intact plant.

The potting system may be made from a substantially flat three dimensional structure of some relatively thin thickness and being of a flexible material having an upper surface and a lower surface substantially parallel to each other. The structure has a top outer thin edge substantially including an arc or straight line and a bottom outer thin edge substantially including an arc or straight line. The lengths of said arcs or straight lines describe the assembled potting system as either being cylindrical or conical shape and the top and bottom diameters of the assembled potting system. The top and bottom outer thin edges are distanced from each other substantially by a left and a right outer thin edge each including a straight or curved line. This distance being roughly the height of the assembled potting system. The structure further includes openings or holes placed in close proximity to said left and right outer thin edges that cooperate and are in partnership with each other when the potting system is rolled up and laced. The left and right openings align for lacing during assembly thus providing a structure to contain and provide a volume for a suitable plant growing media and plant.

When assembled the openings are held in close proximity by a relatively long relatively thin lace projection emanating from said top outer edge in close proximity to the right or left outer thin edge. The lace projection being of a length and width that allows it to be bendable and slid ably threaded or laced thru said left and right openings aligned when the structure is rolled up for assembly. The lace projection being further described as having a grip area being at a convenient distance from said top outer edge and wider than said projection and/or having a texture or opening(s) so as to make removing or disassembly of said lace projection easier. A portion of the grip area also may provide a stop to said lace projection when threading or lacing or lacing it through said openings in said structure. The bottom outer thin edge further including two or more appendages each being of a desirable shape that describes the bottom of the assembled potting system, usually being of substantially partially circular shapes. The appendages are each cut to form end shapes that will allow them to interlock together when assembled. Each of the appendages is connected to the structure by one or more hinge portions, each including as the area between slot shapes in said structure allowing the appendages to have a bendable hinge between themselves and said structure. The length of the slots and therefore the length of the hinge is dependent upon the material used in construction.

During assembly the structure is rolled left to right and said lace projection is threaded thru the now aligned said openings. The appendages are then bent inward and interlocked forming the bottom of the assembled potting system. Moving or carrying the potting system may be made easy by the possible addition of two handles located at two portions of the top outer thin edge. The handles usually set at opposite sides of the assembled potting system. It should be noted that the potting system may be manufactured from multiple different pieces and thicknesses for cost purposes. For example the body, lace and two bottom appendages may be manufactured separately then fastened back together to form a single assembly without departing from the potting system.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A potting system including:
- a bendable pot side including:
  - a plurality of first lacing apertures;
  - a plurality of second lacing apertures;
  - at least one first bottom panel aperture; and
  - at least one second bottom panel aperture;
- a first bottom panel, wherein said first bottom panel is a separate structure from said bendable pot side and is not initially mechanically engaged with said bendable pot side, said first bottom panel including:
  - at least one first bottom panel tab; and
  - a first bottom panel mesh structure;
- a second bottom panel, wherein said second bottom panel is a separate structure from said bendable pot side and is not initially mechanically engaged with said bendable pot side, said second bottom panel including:
  - at least one second bottom panel tab; and
  - a second bottom panel mesh structure; and
- a pull lace including:
  - a lace insert portion,
- wherein said potting system is assembled by:
- inserting said at least one first bottom panel tab into said at least one first bottom panel aperture to mechanically engage said first bottom panel with said bendable pot side and inserting said at least one second bottom panel tab into said at least one second bottom panel aperture to mechanically engage said second bottom panel with said bendable pot side,
- engaging said first bottom panel mesh structure with said second bottom panel mesh structure to mechanically engage said second bottom panel with said first bottom panel,
- bending said pot side so that said plurality of first lacing apertures align with said plurality of second lacing apertures, and
- inserting said lace insert portion of said pull lace through said plurality of first lacing apertures and said plurality of second lacing apertures,
- wherein said first bottom panel and said second bottom panel are separate structures.

2. The potting system of claim 1 wherein said pot side includes at least one lifting tab.

3. The potting system of claim 1 wherein said lifting tab includes a tab grip structure.

4. The potting system of claim 1 wherein at least one of said at least one first bottom panel aperture and said at least one second bottom panel aperture constitute a plurality of bottom panel apertures and said at least one first bottom panel tab and said at least one second bottom panel tab constitute a plurality of tabs.

5. The potting system of claim 1 at least one of said plurality of first lacing apertures and said plurality of second lacing apertures constitutes three lacing apertures.

6. The potting system of claim 1 wherein at least one of said first bottom panel mesh structure and said second bottom panel mesh structure includes a first inset portion and a plurality of extended portions.

7. The potting system of claim 1 wherein at least one of said first bottom panel mesh structure and said second bottom panel mesh structure includes a first extended portion and a plurality of inset portions.

8. The potting system of claim 1 wherein one of said first bottom panel mesh structure and said second bottom panel mesh structure includes a slit and the other includes an extended portion for insertion in said slit.

9. The potting system of claim 1 wherein at least one of said first bottom panel mesh structure and said second bottom panel mesh structure includes a plurality of interlocking protrusions.

10. The potting system of claim 1 wherein said bendable pot side is shaped so that, when said plurality of first lacing apertures are aligned with said plurality of second lacing apertures, said bendable pot side assumes an inverted frustoconical shape.

11. The potting system of claim 1 wherein said bendable pot side is shaped so that, when said plurality of first lacing apertures are aligned with said plurality of second lacing apertures, said bendable pot side assumes a frustoconical shape.

12. The potting system of claim 1 wherein said bendable pot side is shaped so that, when said plurality of first lacing apertures are aligned with said plurality of second lacing apertures, said bendable pot side assumes a cylindrical shape.

13. The potting system of claim 1 wherein said bendable pot side is shaped so that, when said plurality of first lacing apertures are aligned with said plurality of second lacing apertures, said bendable pot side assumes a rectilinear shape.

14. The potting system of claim 1 wherein said pot side is composed of a plurality of pot sides.

15. The potting system of claim 14 wherein said plurality of pot sides are joined together using a plurality of pull laces when forming said potting system.

16. The potting system of claim 1 wherein at least one of said pot side, said first bottom panel, said second bottom panel, and said lace pull include at least one aperture to allow water to pass through.

17. A potting system including:
a bendable pot side including:
a plurality of first lacing apertures;
a plurality of second lacing apertures;
at least one first pot side attachment structure; and
at least one second pot side attachment structure;
a first bottom panel, wherein said first bottom panel is a separate structure from said bendable pot side and is not initially mechanically engaged with said bendable pot side, said first bottom panel including:
at least one first bottom panel attachment structure; and
a first bottom panel mesh structure;
a second bottom panel, wherein said second bottom panel is a separate structure from said bendable pot side and is not initially mechanically engaged with said bendable pot side, said second bottom panel including:
at least one second bottom panel attachment structure; and
a second bottom panel mesh structure; and
a pull lace including:
a lace insert portion,
wherein said potting system is assembled by:
removably affixing said at least one first bottom panel attachment structure to said at least one first pot side attachment structure to mechanically engage said first bottom panel with said bendable pot side and removably affixing said at least one second bottom panel attachment structure to said at least one second pot side attachment structure to mechanically engage said second bottom panel with said bendable pot side,
engaging said first bottom panel mesh structure with said second bottom panel mesh structure to mechanically engage said second bottom panel with said first bottom panel,
bending said pot side so that said plurality of first lacing apertures align with said plurality of second lacing apertures, and
inserting said lace insert portion of said pull lace through said plurality of first lacing apertures and said plurality of second lacing apertures,
wherein said first bottom panel and said second bottom panel are separate structures.

18. The potting system of claim 17 wherein at least one of said at least one first pot side attachment structure, at least one second pot side attachment structure, at least one first bottom panel attachment structure, and at least one second bottom panel attachment structure is adhered.

19. The potting system of claim 17 wherein said at least one first pot side attachment structure is formed as a unitary part of said at least one first bottom panel attachment structure.

20. The potting system of claim 17 wherein said at least one first pot side attachment structure is mechanically engaged with said at least one first bottom panel attachment structure.

* * * * *